US008395623B2

(12) United States Patent
Houghtlin et al.

(10) Patent No.: US 8,395,623 B2
(45) Date of Patent: Mar. 12, 2013

(54) GENERATING AND DISPLAYING AN APPLICATION FLOW DIAGRAM THAT MAPS BUSINESS TRANSACTIONS FOR APPLICATION PERFORMANCE ENGINEERING

(75) Inventors: Mark Robert Houghtlin, Raleigh, NC (US); Michael Anthony Mendez, Murrieta, CA (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 12/471,958

(22) Filed: May 26, 2009

(65) Prior Publication Data

US 2010/0302248 A1 Dec. 2, 2010

(51) Int. Cl.
*G06T 11/20* (2006.01)
*G06F 3/048* (2006.01)

(52) U.S. Cl. .................. 345/440; 345/440.1; 345/440.2; 345/441; 345/442; 705/5; 705/7.12

(58) Field of Classification Search .......... 345/440–442; 705/7, 5, 7.12
See application file for complete search history.

(56) References Cited

U.S. PATENT DOCUMENTS

| | | | |
|---|---|---|---|
| 2004/0205100 A1 | 10/2004 | Olsson et al. | |
| 2006/0190655 A1 | 8/2006 | Kautzman et al. | |
| 2007/0150384 A1 | 6/2007 | John et al. | |
| 2007/0168203 A1 | 7/2007 | Chan et al. | |
| 2008/0004923 A1* | 1/2008 | Hacigumus | 705/7 |
| 2008/0317217 A1* | 12/2008 | Bernardini et al. | 379/32.03 |

OTHER PUBLICATIONS

O. Zimmermann, et. al., "Service-oriented architecture and business process choreography in an order management scenario: rationale, concepts, lessons learned", Companion to the 20th Annual ACM SIGPLAN Conf. on Object-Oriented Programming, Systems, Languages, and Applications, Oct. 16-20, 2005, OOPSLA'05, New York, NY, pp. 301-312.*

Kounev, S. et al.; Autonomic QoS-Aware Resource Management in Grid Computing Using Online Performance Models; Valuetools '07, Oct. 23-25, 2007, Nantes, France; 10 pages.

Zimmerman, O. et al.; Service-Oriented Architecture and Business Process Choreography in an Order Management Scenario: Rationale, Concepts, Lessons Learned; OOPSLA '05, Oct. 16-20, 2005, San Diego, California, USA; pp. 301-312.

Chourabi, H. et al.; BPMapping and UMM in Business Process Modeling for e-Government Processes; The Proceedings of the 9th Annual International Digital Government Research Conference; 2006; pp. 282-289.

* cited by examiner

*Primary Examiner* — Jin-Cheng Wang
(74) *Attorney, Agent, or Firm* — Schmeiser, Olsen & Watt; Anna Linne

(57) ABSTRACT

A method and apparatus for generating and displaying an application flow diagram for an application. The application flow diagram includes: a set of business transaction display elements representing critical business transactions that sustain or provide revenue for an organization; a set of service display elements representing services required by the critical business transactions; a set of infrastructure display elements representing information technology (IT) infrastructure components utilized by the services; and formatted display elements (e.g., arrows) that map the business transaction display elements to the service display elements and the service display elements to the infrastructure display elements, thereby indicating an end-to-end flow of data between the critical business transactions and the IT infrastructure components.

18 Claims, 12 Drawing Sheets

GENERATING AND DISPLAYING AN APPLICATION FLOW DIAGRAM THAT MAPS BUSINESS TRANSACTIONS FOR APPLICATION PERFORMANCE ENGINEERING

FIELD OF THE INVENTION

The present invention relates to display systems and more particularly to display systems that present application flow diagrams.

BACKGROUND OF THE INVENTION

In conventional application mapping technologies, information technology (IT) transactions are mapped to infrastructure without resolving the IT transactions to business functions, and critical business assets are not identified and mapped, thereby leaving the critical business assets vulnerable to changes in infrastructure. Furthermore, known application mapping techniques fail to identify the cost and value of critical business assets to facilitate application performance engineering recommendations. Thus, there exists a need to overcome at least one of the preceding deficiencies and limitations of the related art.

SUMMARY OF THE INVENTION

The present invention provides an apparatus comprising a display device configured to display an application flow diagram for an application. The application flow diagram includes a set of business transaction display elements, a set of service display elements, a set of infrastructure display elements, a first set of formatted display elements, and a second set of formatted display elements. The set of business transaction display elements represents a plurality of critical business transactions that sustain or provide revenue for an organization. The set of service display elements represents a plurality of services required by the critical business transactions. Each critical business transaction includes one or more services of the plurality of services. The set of infrastructure display elements represents a plurality of components of an information technology infrastructure (IT infrastructure components). Each service utilizes one or more IT infrastructure components of the plurality of IT infrastructure components. The first set of formatted display elements (e.g., colored arrows) maps the set of business transaction display elements to the set of service display elements. Each business transaction display element is connected to a corresponding one or more service display elements of the set of service display elements via one or more formatted display elements of the first set of formatted display elements to represent a first flow of data between the critical business transactions and the services. The second set of formatted display elements maps the set of service display elements to the set of infrastructure display elements. Each service display element is connected to a corresponding one or more infrastructure display elements of the set of infrastructure display elements via one or more formatted display elements of the second set of formatted display elements to represent a second flow of data between the services and the IT infrastructure components. The first flow of data and the second flow of data indicate an end-to-end flow of data between the critical business transactions and the IT infrastructure components.

A method and computer program product corresponding to the above-summarized apparatus are also described and claimed herein.

The present invention includes displaying a mapping of critical business transactions to infrastructure in an application flow diagram, thereby allowing an organization to identify and protect critical business assets across multiple functional units (e.g., business units) of the organization.

DETAILED DESCRIPTION OF THE INVENTION

Overview

In one or more embodiments, the present invention captures, documents and directly maps critical business transactions to the application(s) and network and application infrastructure that supports the critical business transactions. Based on issue-based consulting methodology, the mapping of critical business transactions may be documented and empirically validated. The business value of each portion of the critical business transaction mapping may be quantified based on performance engineering statistics and actual costs. The present invention may include displaying the mapping of the critical business transactions in an application flow diagram. Once developed, the application flow diagram may be the basis for support, analysis and reporting of application performance engineering efforts. As used herein, a critical business transaction is defined as one or more services (i.e., business services) that are performed by one or more members of an end user organization and that are required by the organization to generate revenue for and/or sustain the organization.

Application Flow Diagram Display

Figure 1:
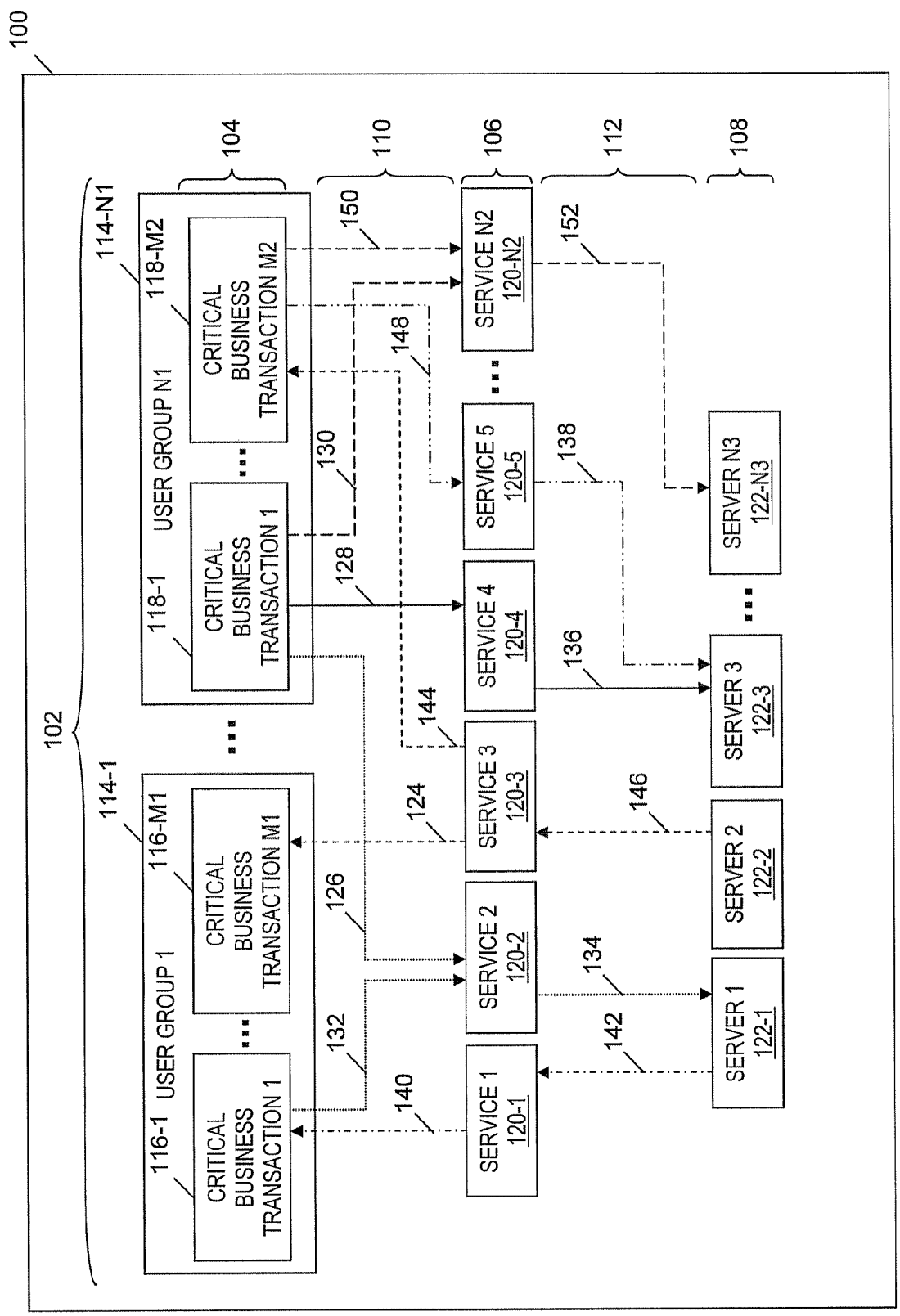
FIG. 1 is a block diagram of a display device that displays an application flow diagram that maps critical business transactions to infrastructure components, in accordance with embodiments of the present invention.

FIG. 1 is a block diagram of a display device that displays an application flow diagram that maps critical business transactions to infrastructure components, in accordance with embodiments of the present invention. Display device 100 includes a display (e.g., a display window) that presents display elements that comprise an application flow diagram 102. Display device 100 is an output device operatively coupled to a computer unit (e.g., computer unit 1001 in FIG. 10). In one embodiment, display device 100 includes a controller configured to present the display elements that comprise an application flow diagram 102.

A first section of application flow diagram 102 includes multiple critical business transactions 104. A second section of application flow diagram 102 includes multiple services 106 that perform the critical business transactions 104. A third section of application flow diagram 102 includes multiple application and/or network infrastructure components 108 that are used to perform the critical business transactions 104. A first set of arrows 110 included in application flow diagram 102 represent data flow between critical business transactions 104 and services 106. A second set of arrows 112 included in application flow diagram 102 represent data flow between services 106 and infrastructure components 108.

As used herein, a service is defined as business procedure performed manually or automated by an end-user, client, or server computer unit (a.k.a. server). As used herein, an infrastructure component is defined as a server or a computing appliance (e.g., accelerator, encryption appliance, cache, or firewall) that changes or directs data in an enterprise business system (i.e., computer procedures that support a business group).

In one embodiment, the first section of application flow diagram 102 also includes N1 user groups (i.e., user groups 114-1, . . . , 114-N1 or user group 1, . . . , user group N1), where N1>1. Each of the user groups 114-1, . . . , 114-N1 includes one or more of the critical business transactions 104 that are performed by users included in the user group. Users are included in a user group based on geography, demographics, access, usage and/or business unit. For example, user group 114-1 includes critical business transactions 116-1, . . . , 116-M1, where M1≧1, and user group 114-N1 includes critical business transactions 118-1, . . . , 118-M2, where M2≧1. A critical business transaction included in a first user group may be the same as a critical business transaction included in a second user group. For example, an email transaction may be included in both user group 114-1 and user group 114-N1.

Although services 106 is depicted in FIG. 1 as including services 120-1, 120-2, 120-3, 120-4, 120-5, . . . , 120-N2, it should be noted that the services 106 may include any number of services in a set of services 120-1, . . . , 120-N2, where N2>1. Similarly, infrastructure components 108 is depicted in FIG. 1 as including server 122-1, 122-2, 122-3, . . . , 122-N3, but the present invention contemplates any number of infrastructure components in a set of infrastructure components 122-1, . . . , 122-N3, where N3>1.

A critical business transaction of critical business transactions 104 may be connected by one arrow included in arrows 110 to exactly one service (e.g., critical business transaction 116-M1 is connected by one arrow 124 to service 120-3). A critical business transaction may be connected by multiple arrows included in arrows 110 to multiple services (e.g., critical business transaction 118-1 is connected by three arrows 126, 128 and 130 to services 120-2, 120-4, and 120-N2, respectively). Furthermore, two or more critical business transactions may be connected by two or more respective arrows to the same service (e.g., critical business transaction 116-1 and critical business transaction 118-1 are connected by arrows 132 and 126, respectively, to service 120-2).

It should be noted that the particular arrows in set of arrows 110 and set of arrows 112 are exemplary in the depiction of application flow diagram 102 in FIG. 1. The present invention contemplates that the set of arrows 110 may consist of a set of arrows not shown in FIG. 1, with the requirement that each of the critical business transactions 104 and a corresponding service in services 106 are connected by at least one arrow in the set of arrows 110. For example, if critical business transactions 104 includes X critical business transactions and services 106 includes N2 services, then the number of arrows in set of arrows 110 includes at least X arrows.

A service of services 106 may be connected by one arrow included in arrows 112 to exactly one infrastructure component (e.g., service 120-2 is connected by one arrow 134 to server 122-1). Although not shown in FIG. 1, a service of services 106 may be connected by multiple arrows included in arrows 112 to multiple infrastructure components. Furthermore, two or more services may be connected by two or more respective arrows to the same infrastructure component (e.g., service 120-4 and service 120-5 are connected by arrows 136 and 138, respectively, to server 122-3).

The particular arrows in set of arrows 112 are exemplary in the depiction of application flow diagram 102 in FIG. 1. The present invention contemplates that the set of arrows 112 may consist of a set of arrows not shown in FIG. 1, with the requirement that each of the services 106 and a corresponding infrastructure component of infrastructure components 108 are connected by at least one arrow in the set of arrows 112.

An end-to-end flow of data (a.k.a. data flow) between a critical business transaction of critical business transactions 104 and an infrastructure component of infrastructure components 108 via a service of services 106 is represented by one arrow in arrows 110 and another arrow in arrows 112, where the arrow in arrows 110 and the other arrow in arrows 112 share a common display characteristic (i.e., formatting characteristic) (e.g., the same color, fill pattern or dash pattern) or another common indicator associated with the display of the arrows. For example, display 100 displays the color of arrow 140 and the color of arrow 142 as the same color to indicate an end-to-end flow of data from server 122-1 to critical business transaction 116-1.

In one embodiment, if critical business transactions included in two user groups are the same transaction and are connected to the same service, then the arrows connecting the critical business transactions to the same service have the same display characteristic or other indicator. For example, critical business transactions 116-1 and 118-1 are the same transaction and are connected to service 120-2 by arrows 132 and 126, respectively, where arrows 132 and 126 are displayed as the same color. In the example of this paragraph, one flow of data from critical business transaction 116-1 to server 122-1 via service 120-2 is represented by arrow 132 having the same color as arrow 134, and another flow of data from critical business transaction 118-1 to server 122-1 via service 120-2 is represented by arrow 126 having the same color as arrow 134.

In one embodiment, display 100 displays services 106 with display characteristics, so that the services are associated with the display characteristics in a one-to-one correspondence (e.g., N2 colors are used to display the N2 services in services 106, where the colors and the services are associated in a one-to-one correspondence). The display characteristic of the service is also shared by any arrow that is connected to the service. For example, display 100 displays service 120-1 as a display element that has a first color, which is the same color as arrows 140 and 142, which are connected thereto. In the example of this paragraph, display 100 displays service 120-2 and arrows 132, 126 and 134 as a second color; service 120-3 and arrows 124, 144, and 146 as a third color; service 120-4 and arrows 128 and 136 as a fourth color; service 120-5 and arrows 148 and 138 as a fifth color; and service 120-N2 and arrows 130, 150 and 152 as a sixth color, where the first through sixth colors are different colors.

Generating Application Flow Diagrams

Figure 2:
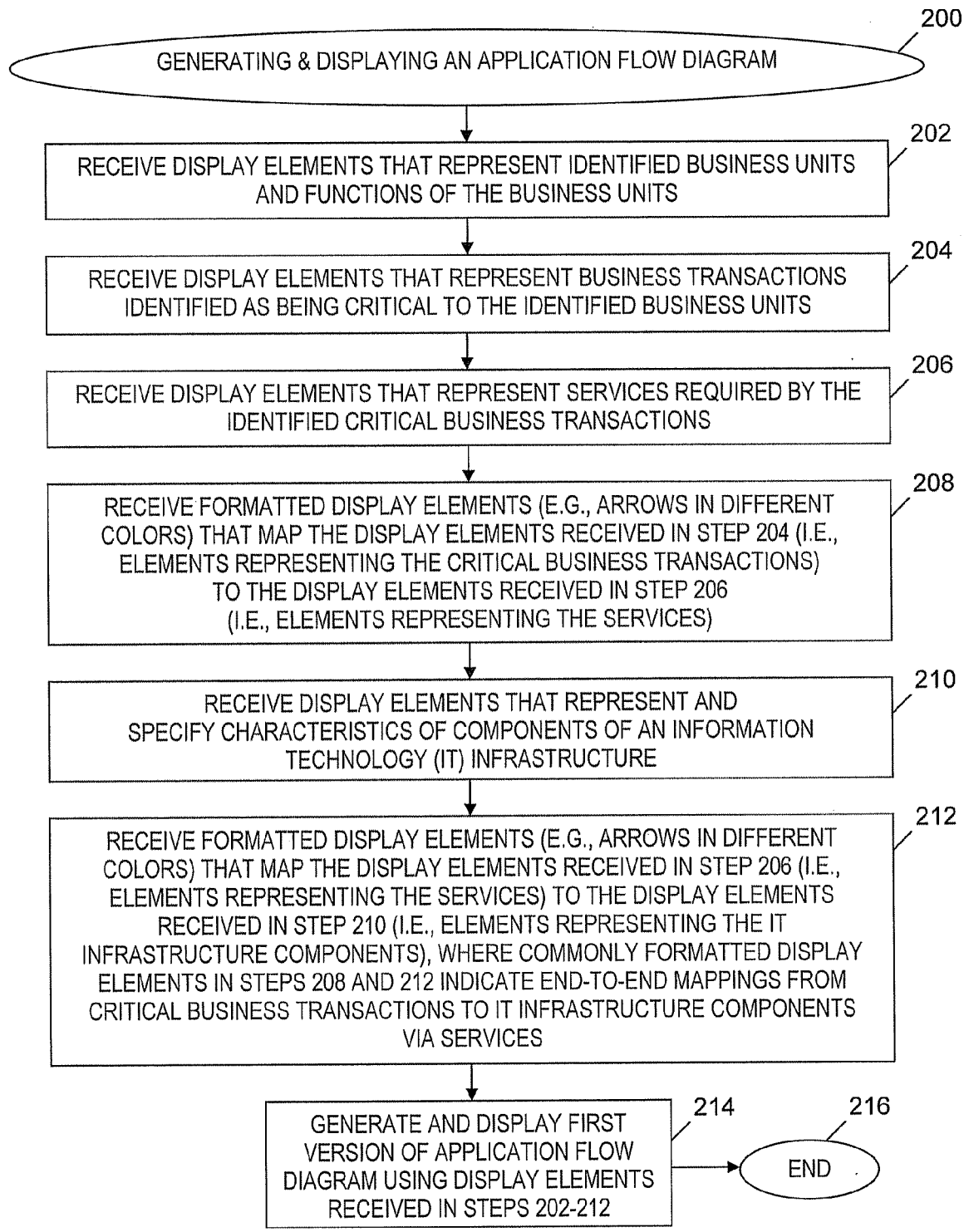
FIG. 2 is a flowchart of a process for generating and displaying the application flow diagram displayed by the display device of FIG. 1, in accordance with embodiments of the present invention.

FIG. 2 is a flowchart of a process for generating and displaying the application flow diagram displayed by the display device of FIG. 1, in accordance with embodiments of the present invention. The process for generating and displaying an application flow diagram starts at step 200. Any reference to a computer unit in this section may refer to computer unit 1001 in FIG. 10 or another computer unit. Any reference to a display device in this section may refer to display 100 in FIG. 1.

A person or team (e.g., business management team) identifies and documents key units (a.k.a. business units) of the organization and one or more functions of each business unit. The function(s) of a business unit are the IT processes of the business unit. The business unit is identified as being a key unit based on predefined criteria. A representative (a.k.a. business unit representative) of an identified business unit identifies and documents critical business transactions of the business unit and services required by the identified critical business transactions. Each identified critical business transaction is associated with at least one of the identified services. If multiple critical business transactions are associated with one identified service, then the critical business transactions are ordered according to predefined criteria. A critical business transaction is identified based on: (1) impact to the organization (i.e., whether the transaction is a mission critical transaction that must be completed by the business unit within a single predefined period of time (e.g., one hour)); (2) usage (i.e., the number of times the transaction or associated service is used by the business unit representative; and (3) volume (i.e., the amount of data transferred within the transaction or associated service in terms of, for example, rows or pages).

One or more persons (e.g., an application support team) identifies and documents application and network infrastructure components (a.k.a. IT infrastructure components), application dependencies, data flow between the identified critical business transactions and the identified services and between the identified services and the identified IT infrastructure components, and underlying client-to-server transport structure (i.e., transport protocols) (e.g., Transmission Control Protocol (TCP) ports) that support the identified data flow to and from the IT infrastructure components.

In one embodiment, the aforementioned business units, critical business transactions, services, infrastructure components, application dependencies, data flow and transport structure are identified and documented via one or more collaborative meetings such as a webinar that shares diagramming software (e.g., Visio® offered by Microsoft Corporation located in Redmond, Wash.).

In step 202, the diagramming software or another software tool executed by a computer unit receives and a display device displays a first set of display elements that represent the identified business units and the identified functions of the business units. In step 204, the diagramming software or another software tool executed by the computer unit receives and the display device displays a second set of display elements that represent the identified critical business transactions. The second set of display elements consists of multiple groups of display elements that represent identified critical business transactions. The display device displays the groups of the second set of display elements in positions or with display characteristics that indicate an association between the groups and the identified business units in a one-to-one correspondence (e.g., each group of display elements representing a group of critical business transactions is displayed under an associated display element representing a business unit). Each group of display elements representing a group of critical business transactions may display the group of critical business transactions in the aforementioned identified order.

In step 206, the diagramming software or another software tool executed by the computer unit receives and the display device displays a third set of display elements that represent the identified services required by the identified critical business transactions associated with one identified business unit. The third set of display elements consists of multiple groups of display elements that represent identified services. The display device displays the groups of the third set of display elements in positions or with display characteristics that indicate an association between the groups and the identified critical business transactions in a one-to-one correspondence (e.g., each group of display elements representing a group of services is displayed under an associated display element representing a critical business transaction). Each group of display elements representing a group of services may display the group of services in an order based on a frequency of usage of each service.

In step 208, the diagramming software or another software tool executed by the computer unit receives and the display device displays a fourth set of display elements (e.g., arrows) that map the second set of display elements received and displayed in step 204 to the third set of display elements received and displayed in step 206. The mapping provided by the fourth set of display elements represents a flow of data between the identified critical business transactions and the identified services. The fourth set of display elements consists of formatted display elements (i.e., display elements that are each displayed with a corresponding display characteristic such as a color, a fill pattern or a dash pattern). For example, a black arrow is a formatted display element that represents data flow from a display element representing an "Open Email" service to a display element representing an "Email" critical business transaction.

In step 210, the diagramming software or another software tool executed by the computer unit receives and the display device displays a fifth set of display elements that represent the identified IT infrastructure components and the identified transport structure that supports the data flow to and from the IT infrastructure components.

In step 212, the diagramming software or another software tool executed by the computer unit receives and the display device displays a sixth set of display elements (e.g., arrows) that map the third set of display elements received and displayed in step 206 to the fifth set of display elements received and displayed in step 210. The mapping provided by the sixth set of display elements represents a flow of data between the identified services and the identified IT infrastructure components. The mapping provided by the sixth set of display element includes a representation of a flow of data to and from any device in the IT infrastructure that may direct or alter the data. In one embodiment, the mapping provided by the sixth set of display elements is based on a network topology diagram received by the computer unit.

The sixth set of display elements consists of formatted display elements (i.e., display elements that are each displayed with a corresponding display characteristic such as a color, a fill pattern or a dash pattern). For example, a black arrow is a formatted display element that represents data flow from a display element representing a Lotus® Notes® server to a display element representing an "Open Email" service.

In step 214, the diagramming software or another software tool executed by the computer unit receives and the display device displays a first version of an application flow diagram that includes the first through sixth sets of display elements received in steps 202, 204, 206, 208, 210 and 212 to map end-to-end data flow between end users of an enterprise business system and the IT infrastructure. That is, the first version of the application flow diagram maps the identified critical business transactions to the identified services and the identified services to the identified IT infrastructure components.

Each display element of the application flow diagram that represents a service (see step 206) is formatted (e.g., color coded) to match the formatting of the display elements (e.g., colors of the arrows) that are connected to the display element that represents the service (see steps 208 and 212).

The display device displays application dependencies and optionally application-to-application dependencies in the first version of the application flow diagram. The application flow diagram may be used to determine the necessity to duplicate transactions that map to the same infrastructure component(s).

The first version (a.k.a. V1) of the application flow diagram generated in step 214 is at a first (i.e., hypothesis) stage of validation (a.k.a. V1 validation) supported by information provided in the aforementioned collaborative meetings. Other stages of validation are described below in the next section. The process of generating and displaying an application flow diagram ends at step 216.

In one embodiment, the first version of the application flow diagram generated and displayed in step 214 is separated into three main sections. The first section of the application flow diagram includes display elements (see step 204) that represent the identified critical business transactions that support users. Display elements that represent user groups may also be included in the first main section. The second section includes display elements that represent the identified services (see step 206). The third section includes display elements that represent the identified IT infrastructure components. The display device displays the formatted display elements (e.g., colored arrows) received in step 208 between the first and second sections. The display device displays the formatted display elements (e.g., colored arrows) received in step 212 between the second and third sections. As one example, the display device displays the first section substantially in an upper portion of a display window, the second section substantially in a middle portion of the display window, and the third section substantially in a lower portion of the display window.

Validating Application Flow Diagrams

Figure 3A:
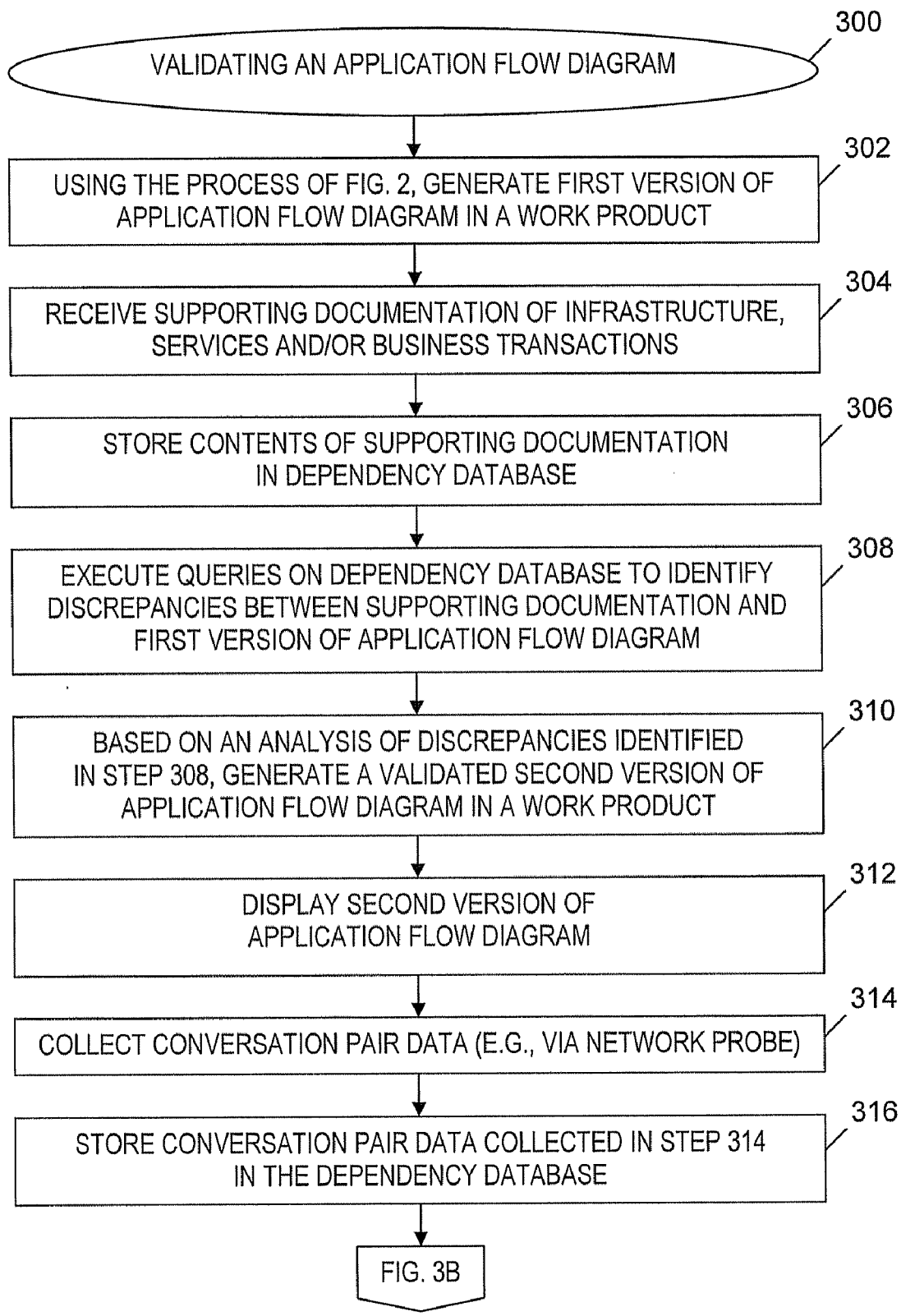
FIGS. 3A-3B depict a flowchart of a process for validating the application flow diagram displayed by the display device of FIG. 1, in accordance with embodiments of the present invention.
Figure 3B:
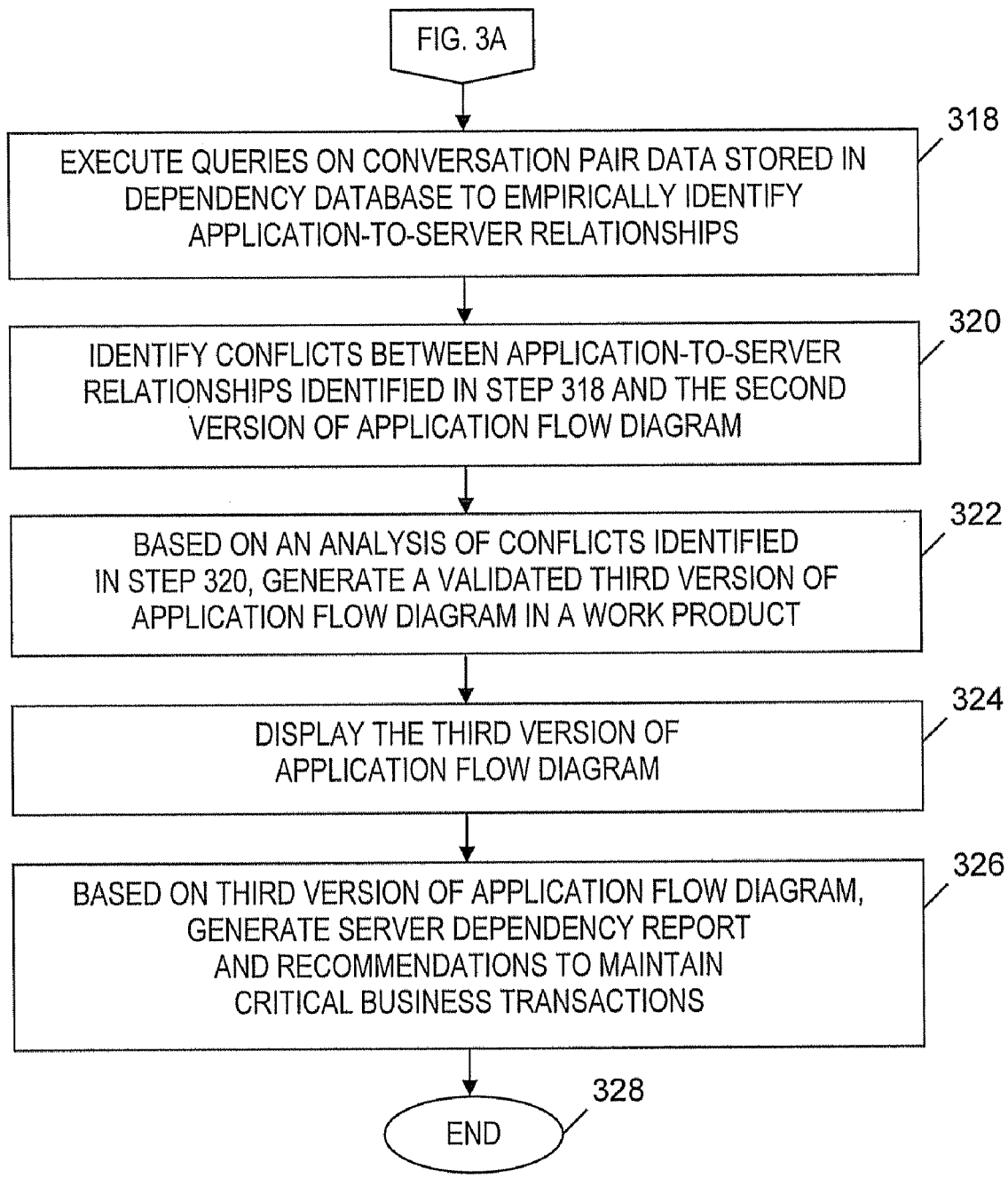

FIGS. 3A-3B depict a flowchart of a process for validating the application flow diagram displayed by the display device of FIG. 1, in accordance with embodiments of the present invention. The process of validating an application flow diagram begins at step 300. In step 302, the process of FIG. 2 is used to generate a first version of an application flow diagram in a work product. Because the first version of the application flow diagram is generated as a result of collaborative meeting(s), a hypothesis is generated that the first version is correct.

In step 304, supporting documentation for the identified critical business transactions, services and/or IT infrastructure components is received from the organization that performs the identified critical business transactions or from another entity. In one embodiment, the supporting documentation is received by the computer unit (e.g., computer unit 1001 in FIG. 10) in step 304. For example, the supporting documentation received in step 304 includes Domain Name System (DNS) listings, topology diagrams, and/or asset management programs. In step 306, the computer unit stores the contents of the supporting documentation received in step 304 into a dependency database residing on a computer data storage unit. The dependency database includes associations of servers to applications. As one example, the dependency database is a relational database.

In step 308, the computer unit executes queries on the dependency database to identify one or more discrepancies between the supporting documentation and the first version of the application flow diagram. For example, data flow identified by the formatted display elements received in step 212 (see FIG. 2) may be different from the data flow described in the supporting documentation.

In step 310, based on an analysis of the one or more discrepancies identified in step 308, the computer unit updates the first version of the application flow diagram to generate an updated, second version (a.k.a. V2) of the application flow diagram in a work product. The update to the second version resolves the one or more discrepancies to attain a second stage of validation (a.k.a. V2 validation) based on the supporting documentation. Continuing the example presented above relative to step 308, the arrows representing the data flow in the first version of the application flow diagram are updated in the second version of the application flow diagram to represent the data flow described in the supporting documentation received in step 304.

In step 312, the display device displays the second version of the application flow diagram.

In step 314, the computer unit collects conversation pair data (i.e., conversation statistics). As one example, a network probe is used to collect the conversation pair data. As another example, a NetFlow data collection and reporting software package (e.g., ReporterAnalyzer offered by NetQoS, Inc. located in Austin, Tex.) is used to collect the conversation pair data, which includes IP addresses of a pair of network components, the number of bytes exchanged or throughput between the pair, and the implied direction of data flow between the pair, and may also include an indication of the upper layer application protocol (e.g., through a TCP port number and/or some other means). In one embodiment, the network traffic data is captured and expressed as conversation pair data at a predefined frequency for a predefined business cycle (e.g., on a daily basis for 7 days).

In step 316, the computer unit stores the conversation pair data collected in step 314 in the dependency database or another database residing on a computer data storage unit. The dependency database is, for example, an Access database offered by Microsoft Corporation. In one embodiment, the dependency database includes fields storing the items listed below:

Business unit
Application
Device hostname
Physical IP address—the primary IP address of the device
Environment—defined by a server list
Tier—specifies Presentation, Application, Database supporting architecture
Access—network gateway Client table
   Source address—defined by data collection tool as the requesting session IP address
   Destination address—defined by data collection tool as the responding or listening session IP address
   Port/Network application—TCP port and data collection tool interpretation of TCP port
   Throughput In—traffic generated by Source address in kilobits per second (kbps)
   Throughput Out—traffic generated by Destination address in kbps The process of validating an application flow diagram continues in FIG. 3B.

In step 318 in FIG. 3B, the computer unit executes queries on the conversation pair data stored in the dependency database or another database to empirically identify application-to-server relationships based on real conversations that were mapped between servers in the IT infrastructure. In one embodiment, the queries executed in step 318 are used to display the server list table based on an input filter for the device hostname, business unit, application, or IP address field in the dependency database, to allow real updates to the server list table, and to sync the dependency database for updates.

In step 320, one or more conflicts between the application-to-server relationships identified in step 318 and the second version of the application flow diagram are identified by analyzing the results of the queries executed in step 318. In one embodiment, the computer unit identifies the conflict(s) in step 320.

In step 322, based on an analysis of the one or more conflicts identified in step 320, the computer unit updates the second version of the application flow diagram to generate an updated, third version (a.k.a. V3) of the application flow diagram in a work product. The update to the second version resolves the one or more conflicts identified in step 320 to attain a third stage of validation (a.k.a. V3 validation) based on the empirical data collection. In step 324, the display device displays the third version of the application flow diagram.

In step 326, based on the third version of the application flow diagram, the computer unit generates a server dependency report and one or more notifications (e.g., recommendations) to maintain the identified critical business transactions. For example, the notification(s) may state a potential impact on critical business transaction(s) if certain servers are separated as a result of a server migration. The process of validating an application flow diagram ends at step 328.

In one embodiment, the computer unit executes predefined queries to generate a server dependency report that identifies server-to-server conversations based on a predefined classification, such as a specific application, business, tier, subnet, network application, protocol, or port. The server dependency report pulls from a server list database table and from a database table that includes the collected conversation pair data. In one embodiment, the server dependency report is organized in two sections: source and destination. For each conversation pair for which data is collected in step 314 (see FIG. 3A), the source section of the server dependency report includes the hostname and source IP address, and the destination section includes the destination IP address, destination port (e.g., TCP port), application name, and Throughput In and Throughput Out values. The hostname and associated application name are pulled from the server list table (e.g., DNS listing table). The source and destination IP addresses, destination port, and throughput values are pulled from the stored conversation pair data.

The server dependency report based on an application maps the source or destination IP addresses to the application name found in the DNS table. A formatting indicator (e.g., a row highlighted in a predefined color) in the server dependency report indicates application-to-application interdependencies.

EXAMPLES

Figure 4A:
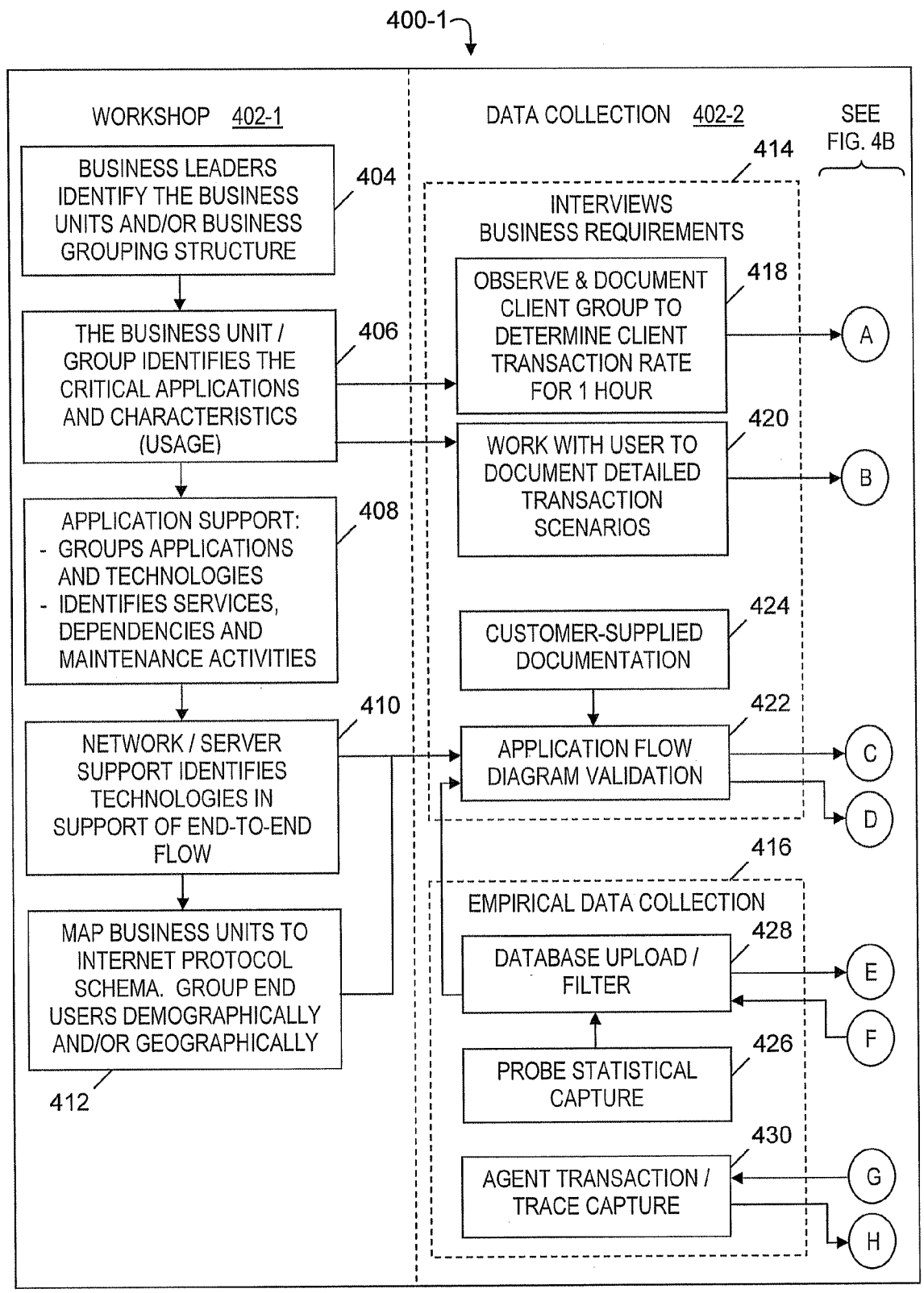
FIG. 4A-4B is a block diagram of an exemplary service-oriented architecture application performance engineering project plan that includes the processes of FIG. 2 and FIGS. 3A-3B, in accordance with embodiments of the present invention.
Figure 4B:
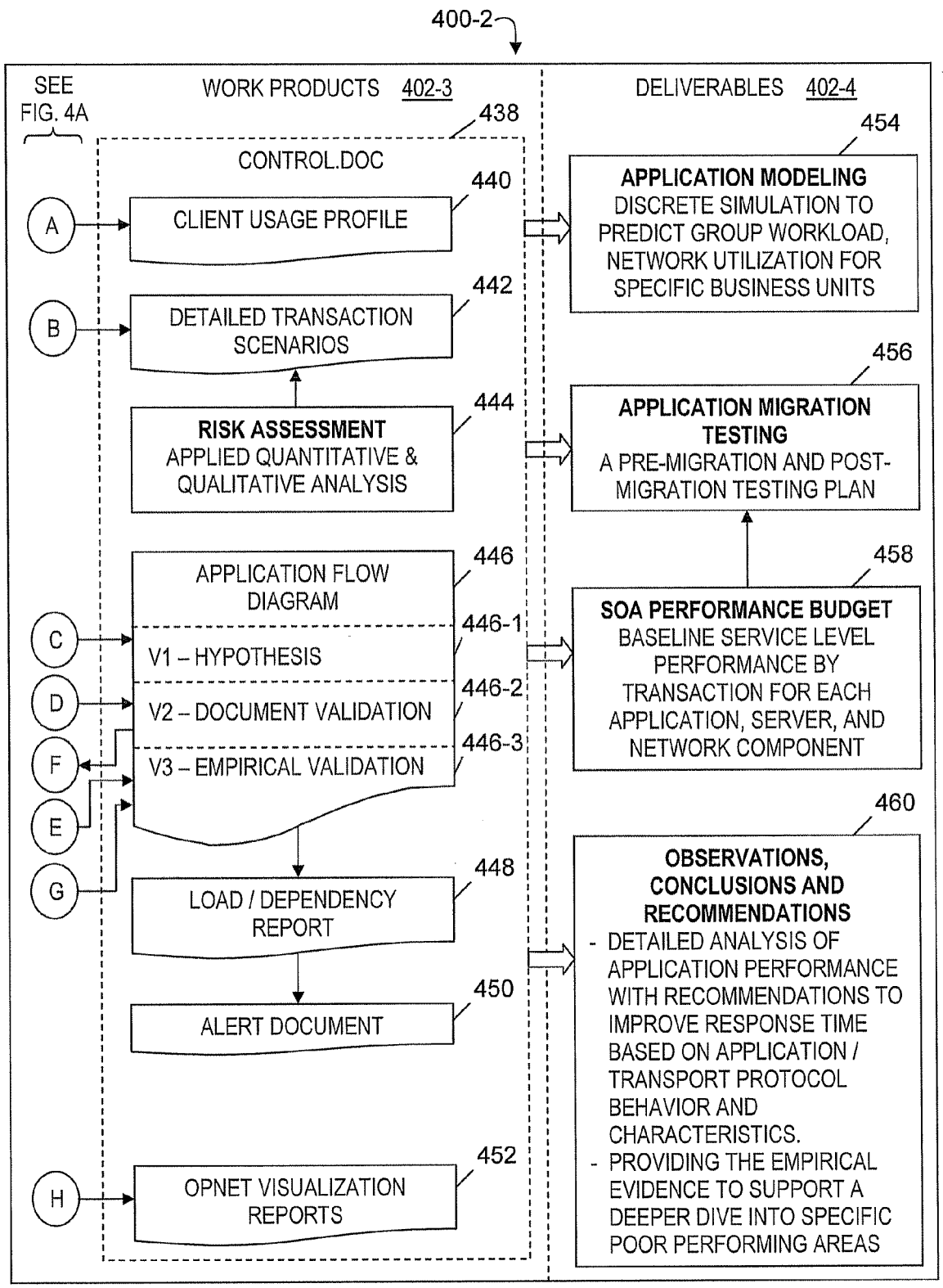

FIG. 4A-4B is a block diagram of an exemplary service-oriented architecture (SOA) application performance engineering project plan that includes the processes of FIG. 2 and FIGS. 3A-3B, in accordance with embodiments of the present invention. A first portion 400-1 of a SOA application performance engineering project plan is shown in FIG. 4A and includes workshop activities 402-1 and data collection activities 402-2. Workshop activities 402-1 start with step 404. In step 404, a business management team identifies key business units and/or a business grouping structure, along with the functions of the identified business units or groups. Step 404 also includes the identified key business units and/or groups being stored in a computer data storage device and displayed by a display device. Step 404 is an example that includes step 202 (see FIG. 2).

In step 406, a representative or liaison of an identified business unit or group identifies the critical applications (i.e., critical business transactions), the services associated with the critical applications, and characteristics (e.g., usage) of the critical applications. The representative or liaison identifies a business transaction as being critical based on the impact to the business (e.g., the transaction must be completed by the business unit within a single hour), usage (i.e., the number of times the business transaction is used by the business unit representative in one hour), and volume (i.e., the amount of data transferred within the business transaction). The identified critical business transactions identified in step 406 are documented and stored in a computer data storage device. Step 406 also includes a display device displaying the identified critical business transactions. Step 406 is an example that includes steps 204 and 206 (see FIG. 2). Steps 418 and 420, which are described below, may follow step 406.

In step 408, an Application support team groups applications, groups technologies (e.g., network devices), and identifies and documents services, application dependencies, maintenance activities, and client-to-server transport structure. The identified application dependencies specify dependencies between the identified critical business transactions and the identified services. Step 408 also includes storing the identified application dependencies in a computer data storage device and displaying the identified application dependencies by a display device. Step 408 is an example that includes step 208 (see FIG. 2).

In step 410, a Network and Server team identifies and documents the technologies (i.e., IT infrastructure components) and the end-to-end data flow, including the data flow between the identified services and the identified infrastructure components. Step 410 also includes identifying and documenting network devices that actually change or direct data based on content. The Network and Server team also identifies server characteristics based on, for example, platform, operating system, central processing unit, memory virtualization schema, and/or processing load. Step 410 also includes storing the identified IT infrastructure components in a computer data storage device. Further, step 410 includes a display device displaying the identified IT infrastructure components. Step 410 is an example that includes steps 210 and 212 (see FIG. 2). Step 422, which is described below, may follow step 410 and/or step 412.

In step 412, business units are mapped to Internet Protocol (IP) schema and demographic and geographic groups of end users. Server resources are grouped in step 412 by type/classification, by the primary business unit(s) that access the resources, and by the service(s) and/or application(s) that are provided by the resources. The groupings in step 412 allow collected data (see data collection section 402-2) to be grouped by resource and resource type/classification and by the end user groups who access the resources, thereby supporting a logical grouping of statistical network traffic data, where the logical grouping is based on engagement requirements.

The data collection section 402-2 includes steps 414 that use interviews and business requirements and other steps 416 that use empirical data collection. In step 418, within each identified business function (i.e., user group) and based on data collection by interview, work of a predetermined number of people in a predetermined time period is observed, monitored and documented. Step 418 may follow step 406. For example, the work of two people within a business function are observed, and monitored for a one-hour period and the business transactions performed by the monitored people are documented. A table is generated in which each row includes the observed business transaction, the service associated with the business transaction, a description of the business transaction, and a count and total of the number of times the business transaction is performed in the predetermined time period (e.g., in an hour).

In step 420, which may follow step 406, a user is interviewed to document detailed transaction scenarios. A transaction scenario documents user interaction steps for each identified service and critical business transaction. Each documented step includes a description, an input, and an expected outcome. The trigger to run a user interaction step is based on a single action by a pointing device (e.g., a single mouse click). A step that moves data may be highlighted in the documentation to indicate that the step is to be captured.

In step 422, an application flow diagram 446 (see FIG. 4B) is generated and validated through three versions (i.e., V1, V2 and V3). A first version (i.e., version V1 446-1 in FIG. 4B) of the application flow diagram is generated as a result of issue-based consulting methodology and the workshop responses from step 410 and/or step 412. The first version of application flow diagram 446 (see FIG. 4B) is hypothesized as being correct (i.e., at a first stage of validation). Step 422 is an example that includes the process of FIGS. 3A-3B.

Customer-supplied documentation 424 (i.e., documentation supplied by the organization that performs the identified critical business transactions) (e.g., DNS listings, topology diagrams, and asset management programs) is used to generate a second version (i.e., version V2 446-2 in FIG. 4B) of the application flow diagram at a second stage of validation. A server listing in the customer-supplied documentation 424 is stored in the dependency database, which maps servers to applications. Predefined queries are executed on the dependency database to identify one or more discrepancies between the first version of the application flow chart and the server listing. The identified one or more discrepancies are resolved (e.g., via validation discussions) by changing the documentation 424 and/or the dependency database. The resolution of the discrepancies results in the generation of the second version of the application flow diagram.

A third version (i.e., version V3 446-3 in FIG. 4B) of the application flow diagram at a third stage of validation is generated by using a result of steps 426 and 428. In step 426, a network probe or a data collection tool (e.g., NetFlow data collection tool) is used to collect conversation pair data for pairs of data collection and aggregation points (i.e., resources in the IT infrastructure identified by the resource connectivity information in a business grouping file that results from step 412). The conversation pair data includes the IP addresses of the pair, throughput values, the implied direction of data flow, and an indication of the upper layer application protocol (e.g., through the TCP port number). Network traffic data is collected and expressed as the conversation pair data for a predetermined period of time (e.g., 7 days) at a predetermined frequency (e.g., hourly) per engagement objectives and requirements.

In step 428, the probe or data collection tool exports the conversation pair data, which is then uploaded to the dependency database at a predetermined frequency (e.g., daily). The conversation pair data is formatted (e.g., in CSV format) so that it may be imported correctly to the dependency database. Predefined queries with filters are executed on the dependency database to generate reports (a.k.a. server dependency reports) to identify server-to-server conversations, including the server-to-server conversations based on a specific application. The server dependency reports are compared to the second version of the application flow diagram to identify one or more conflicts between the second version of the application flow chart and mappings indicated by the server dependency reports. The identified one or more conflicts are resolved by changing the V2 version of the application flow diagram into the V3 version.

The empirical data collection 416 also includes step 430, which is an agent transaction/trace capture that uses the V3 version of the application flow diagram and which supports an OPNET® visualization tool and reports 452 (see FIG. 4B). Additional description of the application flow diagram is presented below relative to FIG. 4B.

A second portion 400-2 of the SOA application performance engineering project plan is shown in FIG. 4B and includes work products 402-3 and deliverables 402-4. Work products 402-3 include the control.doc document 438. The control.doc document 438 includes: a client usage profile 440, detailed transaction scenarios 442, a risk assessment 444 that includes applied quantitative and qualitative analysis, the application flow diagram 446, a load/dependency report 448, an alert document 450 and OPNET® visualization reports 452.

The client usage profile 440 is a result of the data collection in step 418 (see FIG. 4A). The detailed transaction scenarios are the documented results of step 420 (see FIG. 4A) and the risk assessment 444.

The V1 version 446-1 of application flow diagram 446 is a result of the first stage of validation in step 422 (see FIG. 4A). The V2 version 446-2 of application flow diagram 446 is a result of the second stage of validation in step 422. The V3 version 446-3 of application flow diagram 446 is a result of an analysis of the data uploaded to the dependency database in step 428 (see FIG. 4A).

Load/dependency report 448 includes the server dependency report that provides a view of server-to-server dependencies to support any type of resource relocation project and Network LAN Specified Design. Conversation pairs, source IP addresses, destination IP addresses, destination ports, average throughput values, hostnames, and associated applications are include in the server dependency report. The server dependency report may be based on any of a set of predefined classifications (e.g., business unit, tier, subnet, application, network application, protocol or port). The server dependency report is generated and displayed after the conversation pair data collected in step 426 (see FIG. 4A) is loaded into the dependency database and after the validation in step 422 (see FIG. 4A) generates the V3 version 446-3 of application flow diagram 446, thereby ensuring that the servers in the dependency database have been properly associated with the applications that utilize the servers. Multiple queries are executed that pull from server list tables and from conversation pair data tables to generate the server dependency report.

After the steps of the workshop section 402-1 (see FIG. 4A) and the V2 version 446-2 of application flow diagram 446 is generated, the server dependency report is generated, displayed and analyzed. Based on the analysis of the server dependency report, a computer unit generates, stores and displays an alert document 450 that highlights conversations in the server dependency report that are of concern, including conversations on protocol known to have poor network performance. For example, the alert document may highlight conversations between servers that will be separated as a result of a planned server migration, including conversations on ports that are known to be highly sensitive to latency and/or conversations that may perform more slowly across a Wide Area Network (WAN). The alert document 450 includes one or more recommendations or other notifications regarding the highlighted conversations (e.g., recommendations regarding the possible impact of moving certain servers in a server migration). The alert document 450 may also include objectives and acceptance of the alert document, methodology related to the collection of data used to generate an application flow diagram, the application flow diagram (e.g., a V2 version), a diagram of the placement of network probes, observations, conclusions, and data supporting the conclusions.

A first example of a conclusion included in alert document 450 states that a web server that is planned to be moved for Application XYZ has a substantially large number of dependencies (a.k.a. non-identified dependencies) with other applications and infrastructure, where those dependencies were not identified by the steps in workshop 402-1 (see FIG. 4A). The first example of a conclusion further states that the dependencies that were not identified by workshop 402-1 (see FIG. 4A) represent potential post-move response time issues that may not be addressed by user acceptance testing (UAT).

A second example of a conclusion included in alert document 450 for Application XYZ states that conversations that were not identified in the application flow diagram may represent calls to databases because, for example, the conversations are on the MS-SQL database port. The second example of a conclusion determines that these non-identified conversations would pose a business risk if Application XYZ servers are moved without determining what devices (i.e., servers or clients) are associated with the database calls, determining whether the calls are real-time interactions, and quantifying potential user response time impact for real-time transactions.

A third example of a conclusion included in alert document 450 identifies conversations that need to be reviewed, where the conversations are on ports that are known to be highly sensitive to latency and that may traverse the WAN. These identified conversations may indicate real-time interactions between the server that is planned to be moved and other servers, where the real-time interactions are likely to be impacted by moving the server independent of the other servers.

An example of a recommendation included in alert document 450 states that a list of dependencies indicated by highlighted conversations of concern should be reviewed to ensure that a planned UAT addresses potential user response time issues that may be caused by running the traffic indicated by the highlighted conversations across the WAN.

Deliverables 402-4 include application modeling 454, application migration testing 456, SOA performance budget 458, and observations, conclusions and recommendations 460. Application modeling 454 includes discrete simulation to predict group workload and network utilization for specific business units.

Application migration testing 456 includes a pre-migration and post-migration testing plan. SOA performance budget 458 includes baselining service level performance by transaction for each application, server and network component.

Observations, conclusions and recommendations 460 includes (1) a detailed analysis of application performance with recommendations to improve response time based on application and/or transport protocol behavior and characteristics; and (2) empirical evidence to support a deeper dive into specific poor performing areas.

Figure 5:
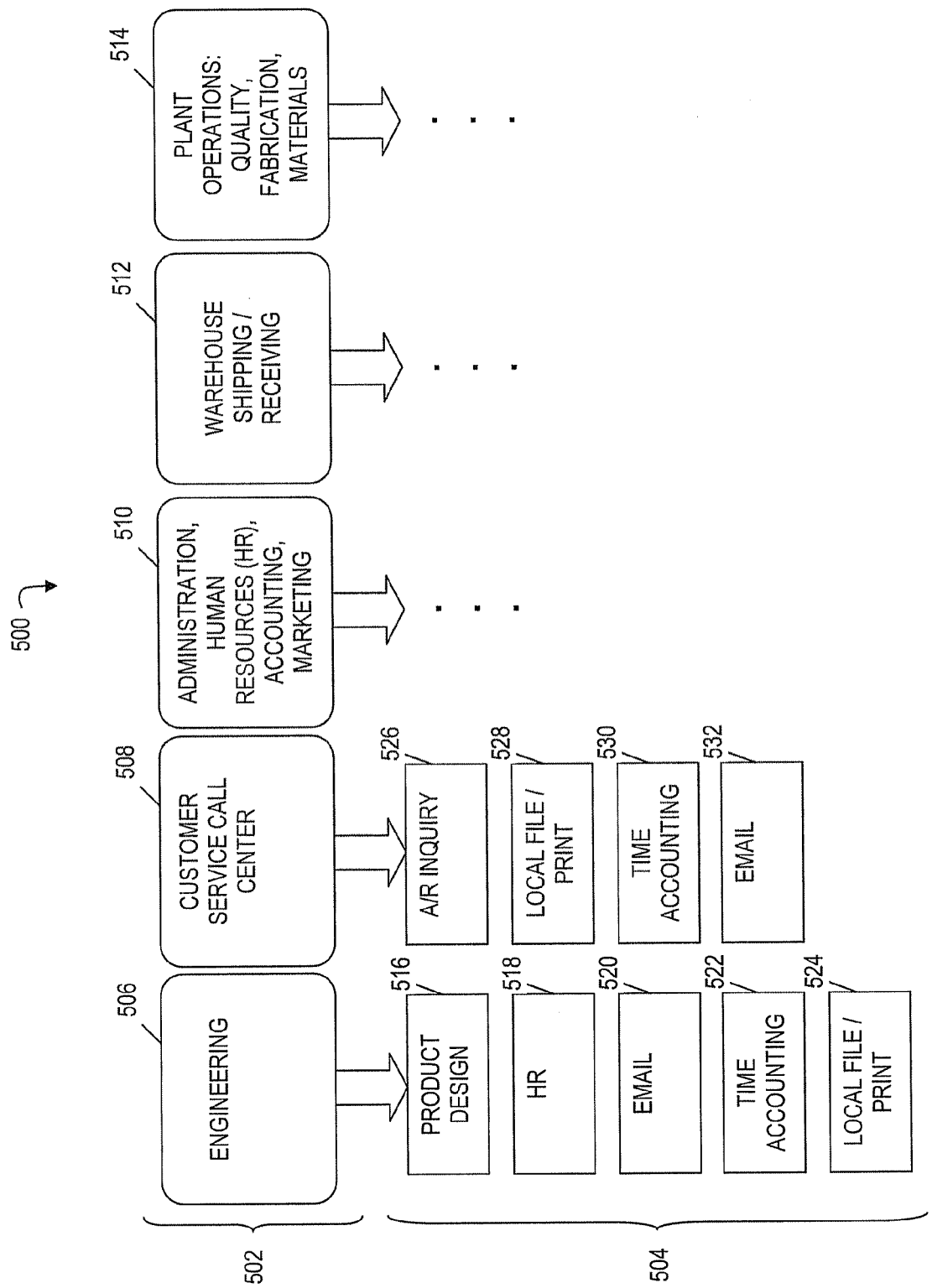
FIG. 5 is a block diagram of exemplary display elements that associate business units and critical business transactions in the process of FIG. 2, in accordance with embodiments of the present invention.

FIG. 5 is a block diagram of exemplary display elements that associate business units and critical business transactions in the process of FIG. 2, in accordance with embodiments of the present invention. Exemplary display elements 500 are display elements received and displayed in steps 202 and 204 in FIG. 2. Display elements 500 include a first group of display elements 502 that indicate identified business units and functions of the business units. Group 502 includes display elements 506, 508, 510, 512, and 514, which respectively represent the following business units: Engineering; Customer Service Call Center; Administration, Human Resources (HR) Accounting, Marketing; Warehouse Shipping and Receiving; and Plant Operations: Quality, Fabrication, Materials.

Display elements 500 also include a second group of display elements 504 that indicate critical business transactions. Each column of display elements in group 504 indicates the critical business transactions that are performed by the business unit represented by the display element in group 502 that is associated with the column (e.g., the display element in group 502 that is above the column).

For example, display elements 516, 518, 520, 522, and 524 respectively represent product design, HR, email, time accounting, and local file and print, which are the identified critical business transactions performed by the Engineering business unit represented by display element 506. As another example, display elements 526, 528, 530 and 532 respectively represent accounts receivable (A/R) inquiry; local file and print; time accounting; and email, which are the identified critical business transactions performed by the Customer Service Call Center business unit represented by display element 508.

In one embodiment, the critical business transactions indicated in each column of group 504 are arranged in order of priority.

Figure 6:
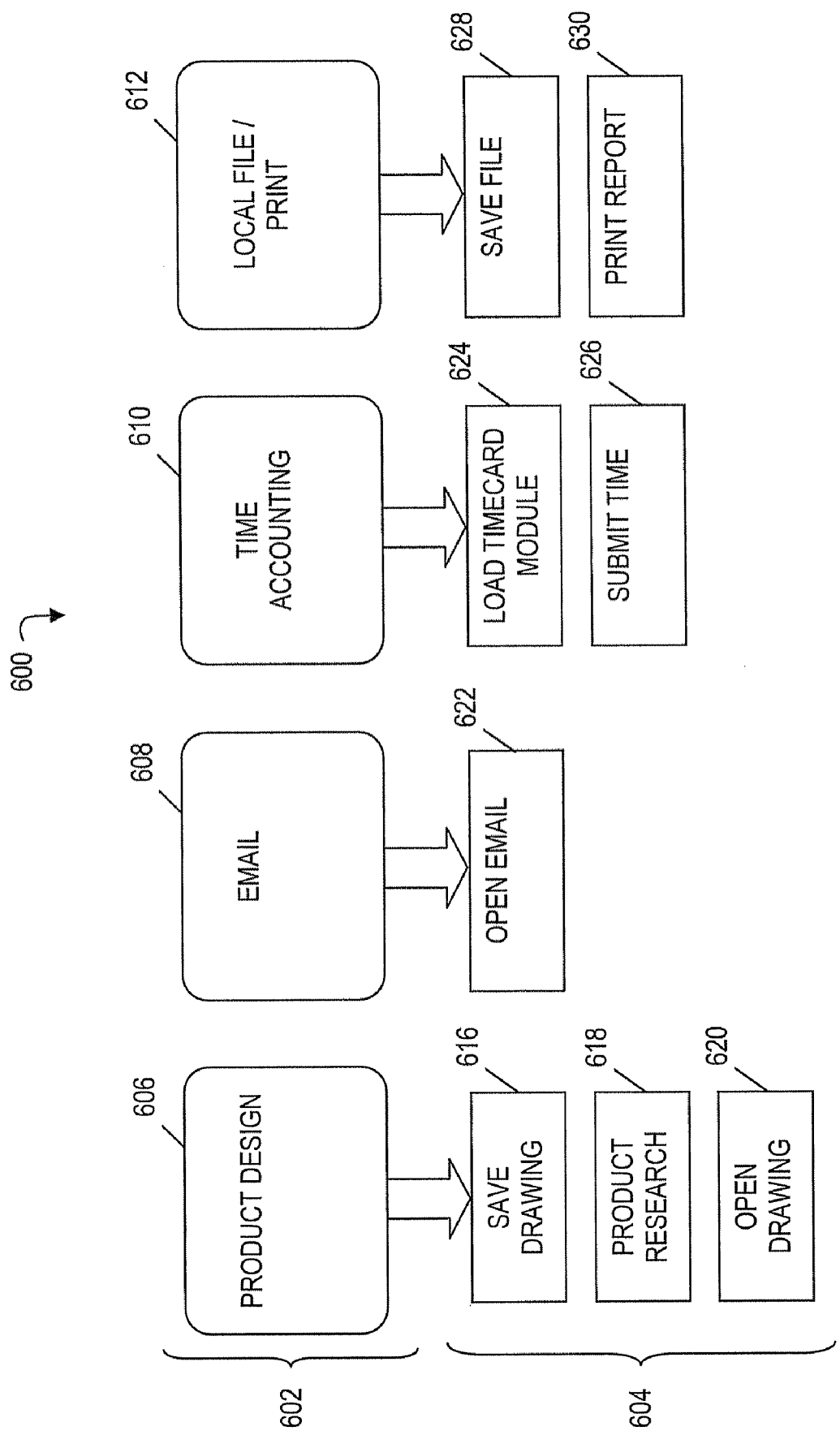
FIG. 6 is a block diagram of exemplary display elements that associate critical business transactions and services in the process of FIG. 2, in accordance with embodiments of the present invention.

FIG. 6 is a block diagram of exemplary display elements that associate critical business transactions and services in the process of FIG. 2, in accordance with embodiments of the present invention. Exemplary display elements 600 are display elements received and displayed in step 206 in FIG. 2. Display elements 600 include a first group of display elements 602 that indicate identified critical business transactions performed by an identified user group within an identified business unit. Group 602 includes display elements representing the following critical business transactions: product design 606, email 608, time accounting 610, and local file and print 612, which are performed by an Engineering Level 1 User included in the Engineering business unit represented by display element 506 (see FIG. 5).

Display elements 600 also include a second group of display elements 604 that indicate services. Each column of display elements in group 604 includes the services that are included in the critical business transaction represented by the display element in group 602 that is associated with the column (e.g., the display element in group 602 that is above the column).

As a first example, display elements 616, 618 and 620 respectively represent the services of save drawing, product research, and open drawing, which are included in the critical business transaction (i.e., product design) indicated by display element 606. As a second example, display element 622 represents an open email service included in the critical business transaction (i.e., email) represented by display element 608. As a third example, display elements 624 and 626 respectively represent the services load timecard module and submit time, which are included in the critical business transaction (i.e., time accounting) indicated by display element 610. As a fourth example, display elements 628 and 630 respectively represent the services save file and print report, which are included in the critical business transaction (i.e., local file/print) indicated by display element 612.

In one embodiment, the services indicated by each column of group 604 are arranged in order of frequency of usage.

Figure 7:
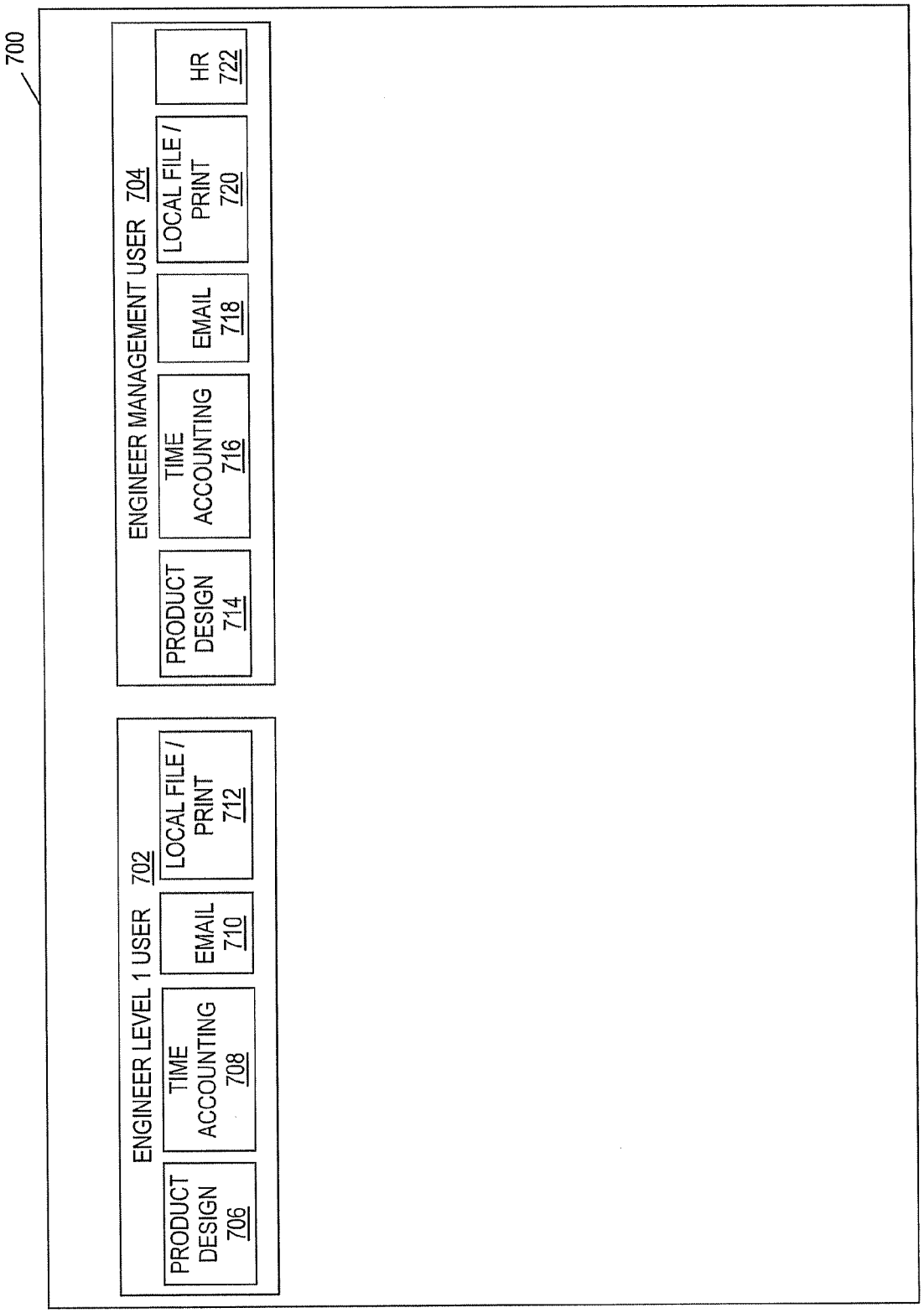
FIG. 7 is a block diagram of a display window that displays a first stage of an exemplary application flow diagram being generated by the process of FIG. 2, in accordance with embodiments of the present invention.

FIG. 7 is a block diagram of a display window that displays a first stage of an exemplary application flow diagram being generated by the process of FIG. 2, in accordance with embodiments of the present invention. A display window 700 is displayed by display device 100 (see FIG. 1) and includes a first stage of an incomplete application flow diagram. The first stage of the incomplete application flow diagram includes display elements 702 and 704, which represent user groups Engineer Level 1 User and Engineer Management User, respectively. Display element 702 includes display elements 706, 708, 710 and 712, which respectively represent the following critical business transactions: product design, time accounting, email and local file/print. Display element 704 includes display elements 714, 716, 718, 720 and 722, which respectively represent the following critical business transactions: product design, time accounting, email, local file/print, and HR. The display elements in FIG. 7 are received by a computer unit and displayed in display window 700 by display device 100 (see FIG. 1) as result of steps 202 and 204 in FIG. 2.

Figure 8:
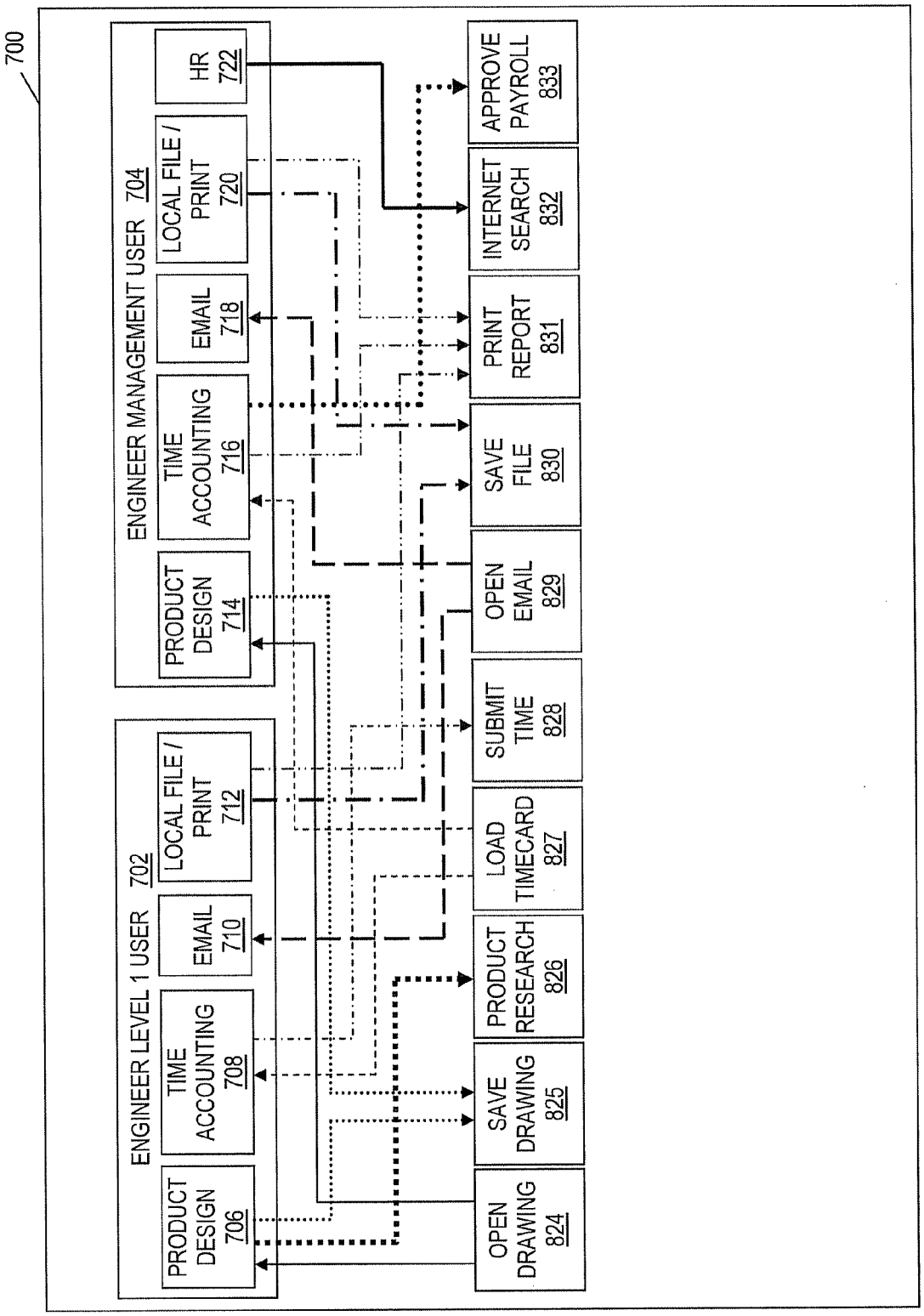
FIG. 8 is a block diagram of the display window of FIG. 7 that displays a second stage of the application flow diagram being generated by the process of FIG. 2, in accordance with embodiments of the present invention.

FIG. 8 is a block diagram of the display window of FIG. 7 that displays a second stage of the application flow diagram being generated by the process of FIG. 2, in accordance with embodiments of the present invention. Display window 700 in FIG. 8 is displayed by display device 100 (see FIG. 1) and includes a second stage of the incomplete application flow diagram whose first stage is depicted in FIG. 7. The second stage of the incomplete application flow diagram includes the display elements depicted in FIG. 7 and described above relative to the discussion of FIG. 7: display element 702, which includes display elements 706, 708, 710 and 712, and display element 704, which includes display elements 714, 716, 718, 720 and 722.

The second stage of the incomplete application flow diagram also includes display elements 824, 825, 826, 827, 828, 829, 830, 831, 832 and 833, which respectively represent the following services: open drawing, save drawing, product research, load timecard, submit time, open email, save file, print report, internet search, and approve payroll. Display elements 824-833 are received by a computer unit and displayed in display window 700 by display device 100 (see FIG. 1) as a result of step 206 (see FIG. 2). The arrows in FIG. 8 indicate the data flow between the represented critical business transactions and the represented services. Display device 700 includes the arrows as a result of step 208 (see FIG. 2).

Figure 9:
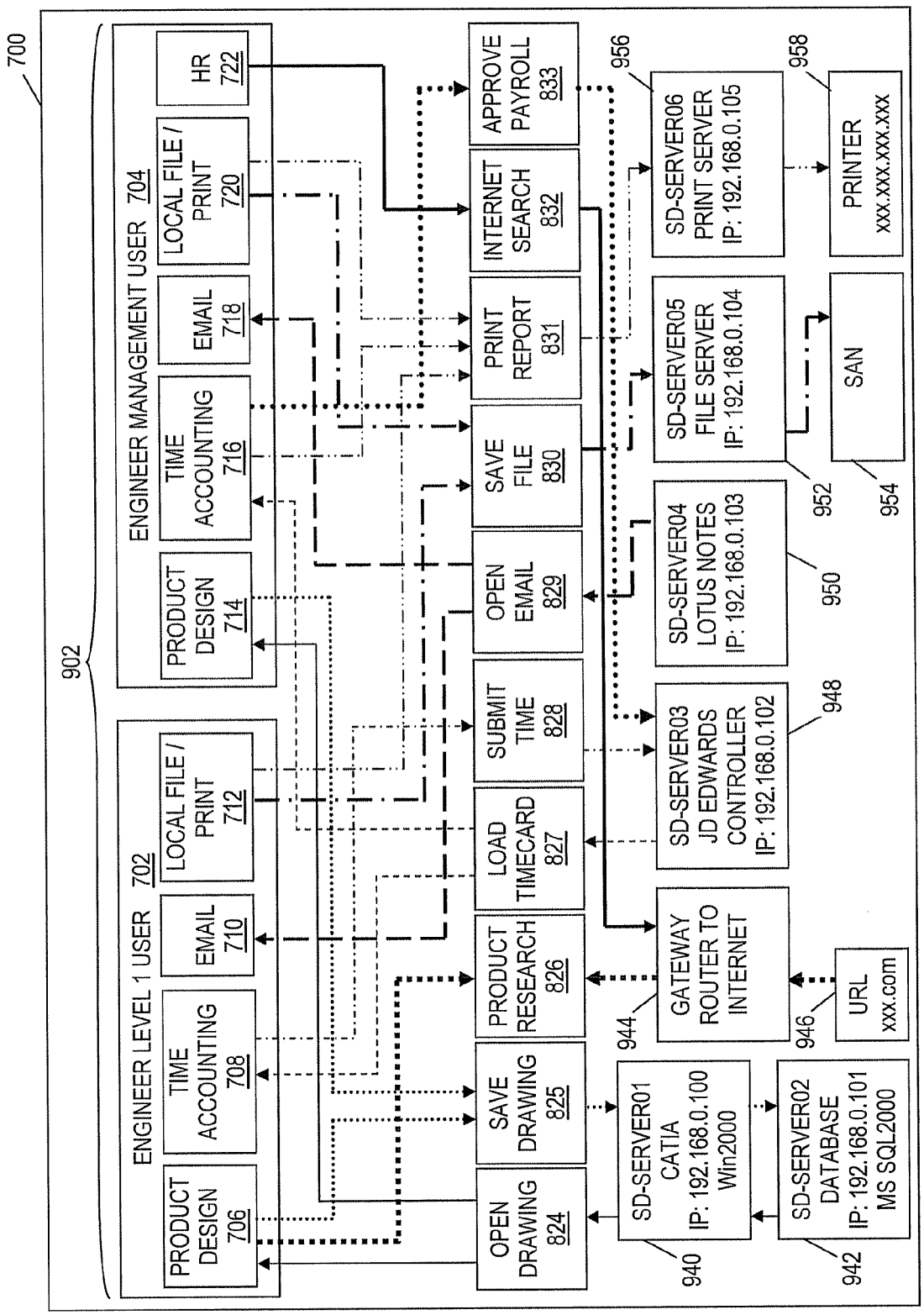
FIG. 9 is a block diagram of the display window of FIG. 7 that displays a complete exemplary application flow diagram generated by the process of FIG. 2, in accordance with embodiments of the present invention.

FIG. 9 is a block diagram of the display window of FIG. 7 that displays a complete exemplary application flow diagram generated by the process of FIG. 2, in accordance with embodiments of the present invention. Display window 700 in FIG. 9 includes a complete exemplary application flow diagram 902, which includes the display elements shown in FIG. 8 and described above relative to the discussions of FIG. 7 and FIG. 8: display elements 702, 704, 706, 708, 710, 712, 714, 716, 718, 720, 722, 824, 825, 826, 827, 828, 829, 830, 831, 832 and 833. Application flow diagram 902 also includes display elements 940, 942, 944, 946, 948, 950, 952, 954, 956 and 958, which represent IT infrastructure components.

Display element 940 represents a first server identified by SD-SERVER01 CATIA, IP address 192.168.0.100, and Win2000. Display element 942 represents a second server (i.e., a database server) identified by SD-SERVER02 DATABASE, IP address 192.168.0.101, and MS SQL2000. Display element 944 represents a gateway router to the Internet and display element 946 represents a Uniform Resource Locator (URL) that specifies a resource being retrieved by the product research service represented by display element 826.

Display element 948 represents a third server identified by SD-SERVER03 JD EDWARDS CONTROLLER and IP address 192.168.0.102. Display element 950 represents a fourth server identified by SD-SERVER04 LOTUS NOTES and IP address 192.168.0.103. Display element 952 represents a fifth server (i.e., a file server) identified by SD-SERVER05 FILE SERVER and IP address 192.168.0.104. Display element 954 represents a storage area network (SAN) accessed by the file server represented by display element 952. Display element 956 represents a sixth server (i.e., a print server) identified by SD-SERVER06 PRINT SERVER and IP address 192.168.0.105. Display element 958 represents a printer accessed by the print server represented by display element 956.

Arrows are added to display window 700 between the display elements representing the services and the display elements representing the IT infrastructure components to indicate data flow between the represented services and the represented IT infrastructure components. A dash pattern used by a first arrow indicating data flow between a critical business transaction and a service and by a second arrow indicating data flow between the service and an IT infrastructure component indicates an end-to-end data flow between the critical business transaction and the IT infrastructure component. For example, in FIG. 9, the "long dash" patterned arrows that connect display element 950 and display element 829 and connect display element 829 and display element 710 indicate a flow of data from a Lotus® Notes® server represented by display element 950 to the critical business transaction of email represented by display element 710, where the flow of data is via the open email service represented by display element 829.

Computer System

Figure 10:
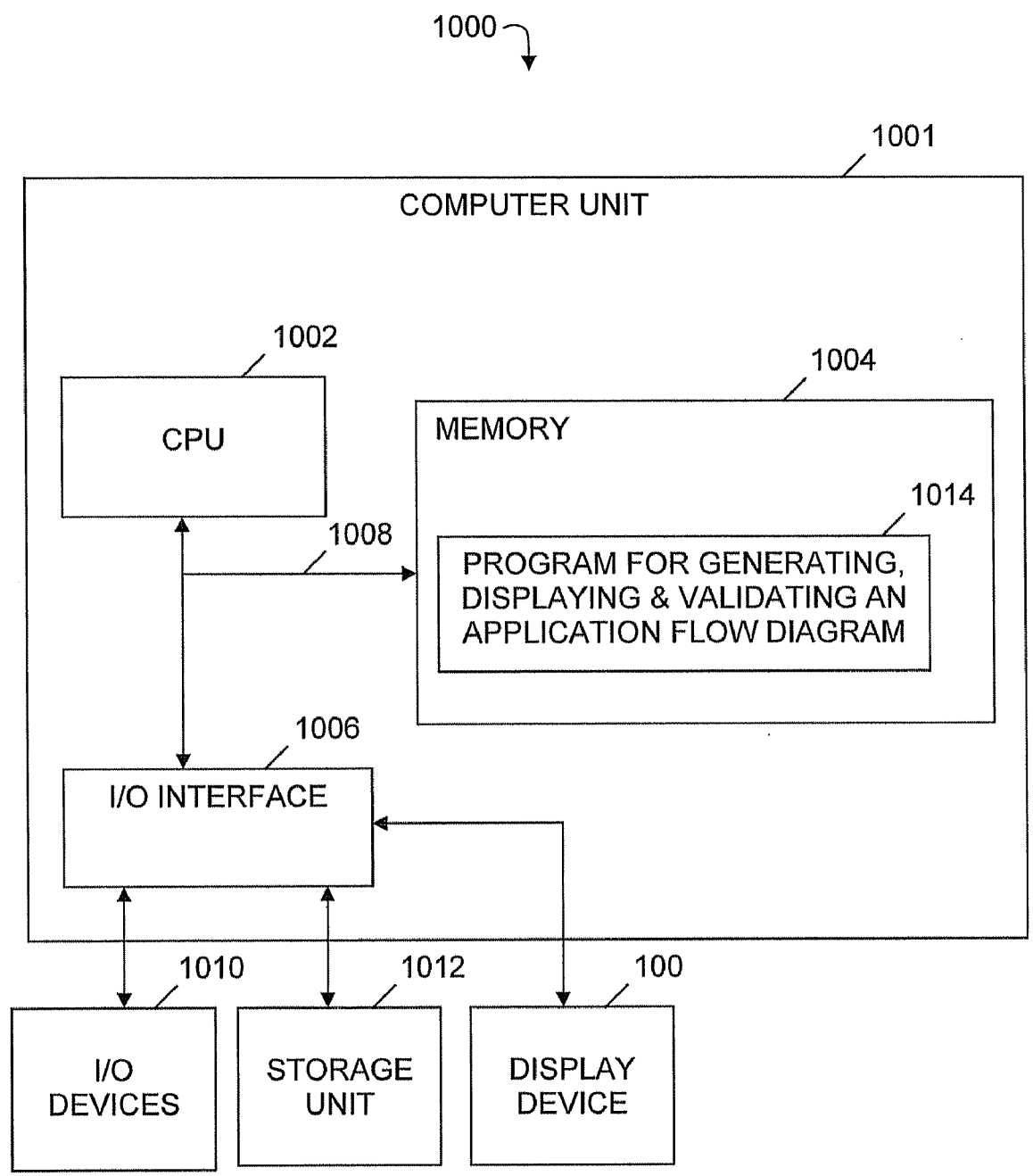
FIG. 10 is a block diagram of a computer system that includes display device of FIG. 1 and that implements the processes of FIGS. 2 and 3A-3B, in accordance with embodiments of the present invention.

FIG. 10 is a block diagram of a computer system that includes display device of FIG. 1 and that implements the processes of FIGS. 2 and 3A-3B, in accordance with embodiments of the present invention. Computer system 1000 generally comprises a computer unit 1001 that includes a central processing unit (CPU) 1002, a memory 1004, an input/output (I/O) interface 1006, and a bus 1008. Further, computer system 1000 includes I/O devices 1010, a computer data storage unit 1012, and display device 100 operatively coupled to computer unit 1001. CPU 1002 performs computation and control functions of computer system 1000. CPU 1002 may comprise a single processing unit, or be distributed across one or more processing units in one or more locations (e.g., on a client and server).

Memory 1004 may comprise any known type of computer data storage and/or transmission media, including bulk storage, magnetic media, optical media, random access memory (RAM), read-only memory (ROM), a data cache, a data object, etc. In one embodiment, cache memory elements of memory 1004 provide temporary storage of at least some program code (e.g., code of program 1014) in order to reduce the number of times code must be retrieved from bulk storage during execution. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN).

I/O interface 1006 comprises any system for exchanging information to or from an external source. I/O devices 1010 comprise any known type of external device, including a display device (e.g., display device 100), keyboard, mouse, printer, speakers, handheld device, facsimile, etc. Bus 1008 provides a communication link between each of the components in computer system 1000, and may comprise any type of transmission link, including electrical, optical, wireless, etc.

I/O interface 1006 also allows computer system 1000 to store and retrieve information (e.g., data or program instructions such as code of program 1014) from an auxiliary storage device such as computer data storage unit 1012 or another computer data storage unit (not shown). Computer data storage unit 1012 may be a non-volatile storage device, such as a magnetic disk drive (i.e., hard disk drive) or an optical disc drive (e.g., a CD-ROM drive which receives a CD-ROM disk).

Memory 1004 includes computer program code for a program 1014 for generating, displaying and validating an application flow diagram according to the processes of FIGS. 2 and 3A-3B. Further, memory 1004 may include other systems not shown in FIG. 10, such as an operating system (e.g., Linux) that runs on CPU 1002 and provides control of various components within and/or connected to computer system 1000.

Memory 1004, storage unit 1012, and/or one or more other computer data storage units (not shown) that are coupled to computer unit 1001 may store display elements received by computer unit 1001 in the process of FIG. 2 and an application flow diagram generated in the process of FIG. 2. The process of FIG. 2 results in a transformation that: (1) transforms a computer data storage unit (e.g., storage unit 1012) from a storage unit that does not store display elements that are included in the application flow diagram generated by the process of FIG. 2 to a computer data storage unit that stores the display elements that are included in the application flow diagram generated by the process of FIG. 2.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., computer system 1000). Furthermore, an embodiment of the present invention may take the form of a computer program product embodied in any tangible medium of expression (e.g., memory 1004 or computer data storage unit 1012) having computer-usable program code (e.g., code for program 1014) embodied or stored in the medium.

Any combination of one or more computer-usable or computer-readable medium(s) (e.g., memory 1004 or computer data storage unit 1012) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 1014 can be electronically captured via, for instance, optical scanning of the paper or other medium, then compiled, interpreted, or otherwise processed in a suitable manner, if necessary, and then stored in a computer memory 1004.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 1014) embodied therewith, either in baseband or as part of a carrier wave. The computer-usable program code may be transmitted using any appropriate medium, including but not limited to wireless, wireline, optical fiber cable, RF, etc.

Computer program code (e.g., code 1014) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer unit 1001). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2 and 3A-3B) and/or block diagrams of methods, apparatus (systems) (e.g., FIG. 1 and FIG. 10), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 1014). These computer program instructions may be provided to a processor (e.g., CPU 1002) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 1004 or computer data storage unit 1012) that can direct a computer (e.g., computer system 1000) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 1000) or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for generating, displaying and validating an application flow diagram. Thus, an embodiment of the present invention discloses a process for supporting computer infrastructure, comprising integrating, hosting, maintaining and deploying computer-readable code (e.g., code 1014) into a computer system (e.g., computer system 1000), wherein the code in combination with the computer system is capable of performing a process of generating, displaying and validating an application flow diagram.

In another embodiment, the invention provides a business method that performs the process steps of the invention on a subscription, advertising and/or fee basis. That is, a service provider, such as a Solution Integrator, can offer to create, maintain, support, etc. a process for generating, displaying and validating an application flow diagram. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2 and 3A-3B and the block diagrams in FIGS. 1 and 10 illustrate the architecture, functionality, and operation of possible implementations of systems, methods, and computer program products according to various embodiments of the present invention. In this regard, each block in the flowchart or block diagrams may represent a module, segment, or portion of code (e.g., code 1014), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An apparatus comprising a display device configured to display an application flow diagram for an application, wherein said application flow diagram includes a set of business transaction display elements including first, second and third business transaction display elements, a set of service display elements including first and second service display elements, a set of infrastructure display elements including first and second infrastructure display elements, a first set of formatted display elements including first, second and third formatted display elements, and a second set of formatted display elements including fourth and fifth formatted display elements, wherein said set of business transaction display elements represents a plurality of business transactions (critical business transactions) that sustain or provide revenue for an organization, said critical business transactions including first, second and third critical business transactions, wherein said first, second and third business transaction display elements represent said first, second and third critical business transactions, respectively, wherein said set of service display elements represents a plurality of services required by said critical business transactions, said plurality of services including first and second services, wherein said first and second service display elements represent said first and second services, respectively, wherein each critical business transaction includes one or more services of said plurality of services, wherein said first and second critical business transactions require said first service, and said third critical business transaction requires said second service, wherein said set of infrastructure display elements represents a plurality of components of an information technology infrastructure (IT infrastructure components) comprising a plurality of servers including first and second servers represented by said first and second infrastructure display elements, respectively, wherein each service utilizes one or more IT infrastructure components of said plurality of IT infrastructure components, wherein said first and second services utilize said first and second servers, respectively, wherein said first and second formatted display elements map said first and second business transaction display elements, respectively, to said first service display element, wherein said third formatted display element maps said third business transaction display element to said second service display element, said first and second formatted display elements formatted with a first formatting characteristic, and said third formatted display element formatted with a second formatting characteristic, said first formatting characteristic being different from said second formatting characteristic, wherein said fourth formatted display element maps said first service display element to said first infrastructure display element, wherein said fifth formatted display element maps said second display element to said second infrastructure display element, said fourth formatted display element formatted with said first formatting characteristic to match said first and second formatted display elements, and said fifth formatted display element formatted with said second formatting characteristic to match said third formatted display element, wherein based on said fourth formatted display element being matched with said first formatted display element by said first formatting characteristic, and based on said fourth formatted display element being matched with said second formatted display element by said first formatting characteristic, said first and fourth formatted display elements represent a first end-to-end flow of data between said first critical business transaction and said first server, and said second and fourth formatted display elements represent a second end-to-end flow of data between said second critical business transaction and said first server, wherein said first and second end-to-end flows of data indicate said first server has a value based on first and second values of said first and second critical business transactions, respectively, wherein based on said fifth formatted display element being matched with said third formatted display element by said second formatting characteristic, said third and fifth formatted display elements represent a third end-to-end flow of data between said third critical business transaction and said second server, wherein said third end-to-end flow of data indicates said second server has a value based on a third value of said third critical business transaction, wherein said value of said first server is greater than said value of said second server, wherein said value of said first server is not based on said third value of said third critical business transaction based on said first formatting characteristic being different from said second formatting characteristic, and wherein said application flow diagram indicates said second server is a candidate for server migration instead of said first server based on said value of said first server being greater than said value of said second server.

2. The apparatus of claim 1, wherein said display device is configured to display said set of business transaction display elements, said set of service display elements, said set of infrastructure display elements, said first set of formatted display elements, and said second set of formatted display elements subsequent to a computer unit receiving said set of business transaction display elements, said set of service display elements, said set of infrastructure display elements, said first set of formatted display elements, and said second set of formatted display elements.

3. The apparatus of claim 1, wherein said display device is configured to display a set of business unit display elements that represent business units that perform said critical business transactions.

4. The apparatus of claim 1, wherein said application flow diagram is a first version of said application flow diagram that is validated based on said set of business transaction display elements, said set of service display elements, said set of infrastructure display elements, said first set of formatted display elements, and said second set of formatted display elements being provided by one or more workshops.

5. The apparatus of claim 4, wherein said display device is configured to display a second version of said application flow diagram that is an update of said first version of said application flow diagram, wherein said update of said first version is based on a resolution of one or more discrepancies between said first version of said application flow diagram and documentation of said critical business transactions, said services and said IT infrastructure components.

6. The apparatus of claim 5, wherein said display device is configured to display a third version of said application flow diagram that is an update of said second version of said application flow diagram, wherein said update of said second version is based on a resolution of one or more conflicts between said second version of said application flow diagram and conversation pair data collected for said application.

7. The apparatus of claim 1, wherein said first, second, third, fourth and fifth formatted display elements are first, second, third, fourth and fifth colored arrows, respectively, wherein said first formatting characteristic is a first color, and wherein said second formatting characteristic is a second color, said first color being different from said second color.

8. The apparatus of claim 7, wherein a color of said first service display element is said first color to indicate said first service display element is included in said first end-to-end flow.

9. A method of generating an application flow diagram for an application, wherein said method comprises:

a computer receiving a set of business transaction display elements that represents a plurality of business transactions (critical business transactions) that sustain or provide revenue for an organization, said set of business transaction display elements including first, second and third business transaction display elements, said critical business transactions including first, second and third critical business transactions, wherein said first, second and third business transaction display elements represent said first, second and third critical business transactions, respectively;

the computer receiving a set of service display elements that represents a plurality of services required by said critical business transactions, said set of service display elements including first and second service display elements, said plurality of services including first and second services, wherein said first and second service display element represent said first and second services, respectively, wherein each critical business transaction includes one or more services of said plurality of services, wherein said first and second critical business transactions require said first service, and said third critical business transaction requires said second service;

the computer receiving a set of infrastructure display elements that represents a plurality of components of an information technology infrastructure (IT infrastructure components), said set of infrastructure display elements including first and second infrastructure display elements, said IT infrastructure components including a plurality of servers including first and second servers represented by said first and second infrastructure display elements, respectively, wherein each service utilizes one or more IT infrastructure components of said plurality of IT infrastructure components, wherein said first and second services utilize said first and second services, respectively;

the computer receiving a first set of formatted display elements including first, second and third formatted display elements, wherein said first and second formatted display elements map said first and second business transaction display elements, respectively, to said first service display element, wherein said third formatted display element maps said third transaction display element to said second service display element, said first and second formatted display elements formatted with a first formatting characteristic, and said third formatted display element formatted with a second formatting characteristic, said first formatting characteristic being different from said second formatting characteristic;

the computer receiving a second set of formatted display elements including fourth and fifth formatted display elements, wherein said fourth formatted display element maps said first service display element to said first infrastructure display element, wherein said fifth formatted display element maps said second display element to said second infrastructure display element, said fourth formatted display element formatted with said first formatting characteristic to match said first and second formatted display elements, and said fifth formatted display element formatted with said second formatting characteristic to match said third formatted display element;

the computer generating said application flow diagram subsequent to said receiving said set of business transaction display elements, said receiving said set of service display elements, said receiving said set of infrastructure display elements, said receiving said first set of formatted display elements, and said receiving said second set of formatted display elements, wherein said application flow diagram includes said set of business transaction display elements, said set of service display elements, said set of infrastructure display elements, said first set of formatted display elements, and said second set of formatted display elements;

the computer displaying said application flow diagram in a display window on a display device;

based on said fourth formatted display element being matched with said first formatted display element by said first formatting characteristic, and based on said fourth formatted display element being matched with said second formatted display element by said first formatting characteristic, the computer determining said first and fourth formatted display elements in said displayed application flow diagram represent a first end-to-end flow of data between said first critical business transaction and said first server, and determining said second and fourth formatted display elements in said displayed application flow diagram represent a second end-to-end flow of data between said second critical business transaction and said first server;

based on said first and second end-to-end flows of data represented in said displayed application flow diagram and based on first and second values of said first and second critical business transactions, respectively, the computer determining a value of said first server;

based on said fifth formatted display element being matched with said third formatted display element by said second formatting characteristic, the computer determining said third and fifth formatted display elements in said displayed application flow diagram represent a third end-to-end flow of data between said third critical business transaction and said second server;

based on said third end-to-end flow of data represented in said displayed application flow diagram, and based on a third value of said third critical business transaction, the computer determining a value of said second server, wherein said value of said first server is greater than said value of said second server, wherein said determining said value of said first server is not based on said third value of said third critical business transaction based on said first formatting characteristic being different from said second formatting characteristic; and based on said value of said first server being greater than said value of said second server, the computer determining said second server is a candidate for a server migration instead of said first server.

10. The method of claim 9, further comprising:

displaying said set of business transaction display elements on said display device subsequent to said receiving said set of business transaction display elements;

displaying said set of service display elements on said display device subsequent to said receiving said set of service display elements;

displaying said set of infrastructure display elements on said display device subsequent to said receiving said set of infrastructure display elements;

displaying said first set of formatted display elements on said display device subsequent to said receiving said first set of formatted display elements; and displaying said second set of formatted display elements on said display device subsequent to said receiving said second set of formatted display elements.

11. The method of claim 9, further comprising:

receiving a set of business unit display elements that represents a plurality of business units that perform said critical business transactions; and displaying said set of business unit display elements on said display device subsequent to said receiving said set of business unit display elements, wherein said application flow diagram includes one or more user group display elements that represent one or more user groups included in a business unit of said plurality of business units.

12. The method of claim 9, wherein said generating said application flow diagram includes generating a first version of said application flow diagram, and wherein said method further comprises validating said first version of said application flow diagram based on said set of business transaction display elements, said set of service display elements, said set of infrastructure display elements, said first set of formatted display elements, and said second set of formatted display elements being provided by one or more workshops.

13. The method of claim 12, further comprising:

receiving documentation of said critical business transactions, said services and said IT infrastructure components;

resolving one or more discrepancies between said first version of said application flow diagram and said documentation;

updating said first version of said application flow diagram to a second version of said application flow diagram based on a result of said resolving said one or more discrepancies; and displaying said second version of said application flow diagram on said display device.

14. The method of claim 13, further comprising:

receiving conversation pair data collected for said application;

resolving one or more conflicts between said second version of said application flow diagram and said conversation pair data;

updating said second version of said application flow diagram to a third version of said application flow diagram based on a result of said one or more conflicts; and displaying said third version of said application flow diagram on said display device.

15. A process for supporting computing infrastructure, said process comprising providing at least one support service for at least one of creating, integrating, hosting, maintaining, and deploying computer-readable code in a computer system comprising a processor, wherein the code, when executed by said processor, causes the computer system to implement a method of generating an application flow diagram for an application, wherein said method comprises:

the computer system receiving a set of business transaction display elements that represents a plurality of business transactions (critical business transactions) that sustain or provide revenue for an organization, said set of business transaction display elements including first, second and third business transaction display elements, said critical business transactions including first, second and third critical business transactions, wherein said first, second and third business transaction display elements represent said first, second and third critical business transactions, respectively;

the computer system receiving a set of service display elements that represents a plurality of services required by said critical business transactions, said set of service display elements including first and second service display elements, said plurality of services including first and second services, wherein said first and second service display elements represent said first and second services, respectively, wherein each critical business transaction includes one or more services of said plurality of services, wherein said first and second critical business transactions require said first service, and said third critical business transaction requires said second service;

receiving a set of infrastructure display elements that represents a plurality of components of an information technology infrastructure (IT infrastructure components), said set of infrastructure display elements including first and second infrastructure display elements, said IT infrastructure components including a plurality of servers including first and second servers represented by said first and second infrastructure display elements, respectively, wherein each service utilizes one or more IT infrastructure components of said plurality of IT infrastructure components, wherein said first and second services utilize said first and second services, respectively;

the computer system receiving a first set of formatted display elements including first, second and third formatted display elements, wherein said first and second formatted display elements map said first and second business transaction display elements, respectively, to said first service display element, wherein said third formatted display element maps said third transaction display element to said second service display element, said first and second formatted display elements formatted with a first formatting characteristic, sand said third formatted display element formatted with a second formatting characteristic, said first formatting characteristic being different from said second formatting characteristic;

the computer system receiving a second set of formatted display elements including fourth and fifth formatted display elements, wherein said fourth formatted display element maps said first service display element to said first infrastructure display element, wherein said fifth formatted display element maps said second display element to said second infrastructure display element, said fourth formatted display element formatted with said first formatting characteristic to match said first and second formatted display elements, and said fifth formatted display element formatted with said second formatting characteristic to match said third formatted display element;

the computer system generating said application flow diagram subsequent to said receiving said set of business transaction display elements, said receiving said set of service display elements, said receiving said set of infrastructure display elements, said receiving said first set of formatted display elements, and said receiving said second set of formatted display elements, wherein said application flow diagram includes said set of business transaction display elements, said set of service display elements, said set of infrastructure display elements, said first set of formatted display elements, and said second set of formatted display elements;

the computer system displaying said application flow diagram in a display window on a display device;

based on said fourth formatted display element being matched with said first formatted display element by said first formatting characteristic, and based on said fourth formatted display element being matched with said second formatted display element by said first formatting characteristic, the computer system determining said first and fourth formatted display elements in said displayed application flow diagram represent a first end-to-end flow of data between said first critical business transaction and said first server, and determining said second and fourth formatted display elements in said displayed application flow diagram represent a second end-to-end flow of data between said second critical business transaction and said first server;

based on said first and second end-to-end flows of data represented in said displayed application flow diagram and based on first and second values of said first and second critical business transactions, respectively, the computer system determining a value of said first server;

based on said fifth formatted display element being matched with said third formatted display element by said second formatting characteristic, the computer system determining said third and fifth formatted display elements in said displayed application flow diagram represent a third end-to-end flow of data between said third critical business transaction and said second server;

based on said third end-to-end flow of data represented in said displayed application flow diagram, and based on a third value of said third critical business transaction, the computer system determining a value of said second server, wherein said value of said first server is greater than said value of said second server, wherein said determining said value of said first server is not based on said third value of said third critical business transaction based on said first formatting characteristic being different from said second formatting characteristic; and based on said value of said first server being greater than said value of said second server, the computer system determining said second server is a candidate for a server migration instead of said first server.

16. The process of claim 15, wherein said method further comprises:

displaying said set of business transaction display elements on said display device subsequent to said receiving said set of business transaction display elements;

displaying said set of service display elements on said display device subsequent to said receiving said set of service display elements;

displaying said set of infrastructure display elements on said display device subsequent to said receiving said set of infrastructure display elements;

displaying said first set of formatted display elements on said display device subsequent to said receiving said first set of formatted display elements; and displaying said second set of formatted display elements on said display device subsequent to said receiving said second set of formatted display elements.

17. The process of claim 15, wherein said method further comprises:

receiving a set of business unit display elements that represents a plurality of business units that perform said critical business transactions; and displaying said set of business unit display elements on said display device subsequent to said receiving said set of business unit display elements, wherein said application flow diagram includes one or more user group display elements that represent one or more user groups included in a business unit of said plurality of business units.

18. The process of claim 15, wherein said generating said application flow diagram includes generating a first version of said application flow diagram, and wherein said method further comprises validating said first version of said application flow diagram based on said set of business transaction display elements, said set of service display elements, said set of infrastructure display elements, said first set of formatted display elements, and said second set of formatted display elements being provided by one or more workshops.

* * * * *